United States Patent [19]

McClurkin

[11] Patent Number: 5,145,049
[45] Date of Patent: Sep. 8, 1992

[54] PATTERN FORMING CONVEYOR

[76] Inventor: Jack McClurkin, 1620 Chesapeake Dr., Hoffman Estates, Ill. 60195

[21] Appl. No.: 596,524

[22] Filed: Oct. 12, 1990

[51] Int. Cl.[5] .............................................. B65G 47/24
[52] U.S. Cl. ................................... 198/374; 198/395; 198/415; 198/782; 198/785
[58] Field of Search ................ 198/372, 374, 382, 395, 198/414, 415, 413, 782, 785

[56] References Cited

U.S. PATENT DOCUMENTS

| | | | |
|---|---|---|---|
| 2,971,659 | 2/1961 | Miller | 198/414 X |
| 3,102,627 | 9/1963 | Acton et al. | 198/456 X |
| 3,241,652 | 3/1966 | Glendy . | |
| 3,247,981 | 4/1966 | Johnson . | |
| 3,252,594 | 5/1966 | Verrinder . | |
| 3,508,640 | 4/1970 | DeGood et al. . | |
| 3,523,601 | 8/1970 | Roth et al. . | |
| 3,587,876 | 6/1971 | Dahlem et al. . | |
| 3,592,328 | 7/1971 | Sapp . | |
| 3,621,973 | 11/1971 | Carlson et al. . | |
| 3,667,389 | 7/1972 | Benetar et al. . | |
| 3,700,127 | 10/1972 | Kurk et al. . | |
| 3,809,214 | 5/1974 | Reist . | |
| 3,820,302 | 6/1974 | Doran et al. . | |
| 3,946,879 | 3/1976 | Jensen . | |
| 3,983,988 | 10/1976 | Maxted et al. | 198/782 X |
| 3,997,781 | 12/1976 | Messman . | |
| 4,014,441 | 3/1977 | Osborn et al. . | |
| 4,039,074 | 8/1977 | Maxted . | |
| 4,067,435 | 1/1978 | Toby . | |
| 4,068,753 | 1/1978 | Jarman . | |
| 4,284,186 | 8/1981 | Brouwer . | |
| 4,352,616 | 10/1982 | Brenner . | |
| 4,456,116 | 6/1984 | Jarman . | |
| 4,517,791 | 5/1985 | Focke . | |
| 4,522,292 | 6/1985 | Euverard et al. . | |
| 4,533,033 | 8/1985 | Van Wegen | 198/413 |
| 4,889,224 | 12/1989 | Denker . | |
| 4,954,042 | 9/1990 | Becicka et al. . | |
| 5,016,748 | 5/1991 | Garzelloni . | |

FOREIGN PATENT DOCUMENTS 1943778  3/1971  Fed. Rep. of Germany ...... 198/785

Primary Examiner—D. Glenn Dayoan
Attorney, Agent, or Firm—Killworth, Gottman, Hagan & Schaeff

[57] ABSTRACT

A conveyor continuously advances bundles issuing from a manufacturing line while manipulating them into a pattern for shipment. Comprised of three zones, the conveyor sequentially centers, rotates and organizes bundles for inclusion in a pattern in preparation for shipment without manual intervention. The conveyor is insensitive to bundle size within the parameters of the particular embodiment, and performs desired manipulation regardless of initial bundle placement or orientation. As no interruption in the flow of bundles is needed to manipulate bundles into patterns, no jamming of bundles occurs upstream from such patterns as they form. The conveyor increases the overall speed of handling bundles, and makes possible the automation of shipping procedures in manufacturing facilities.

32 Claims, 14 Drawing Sheets

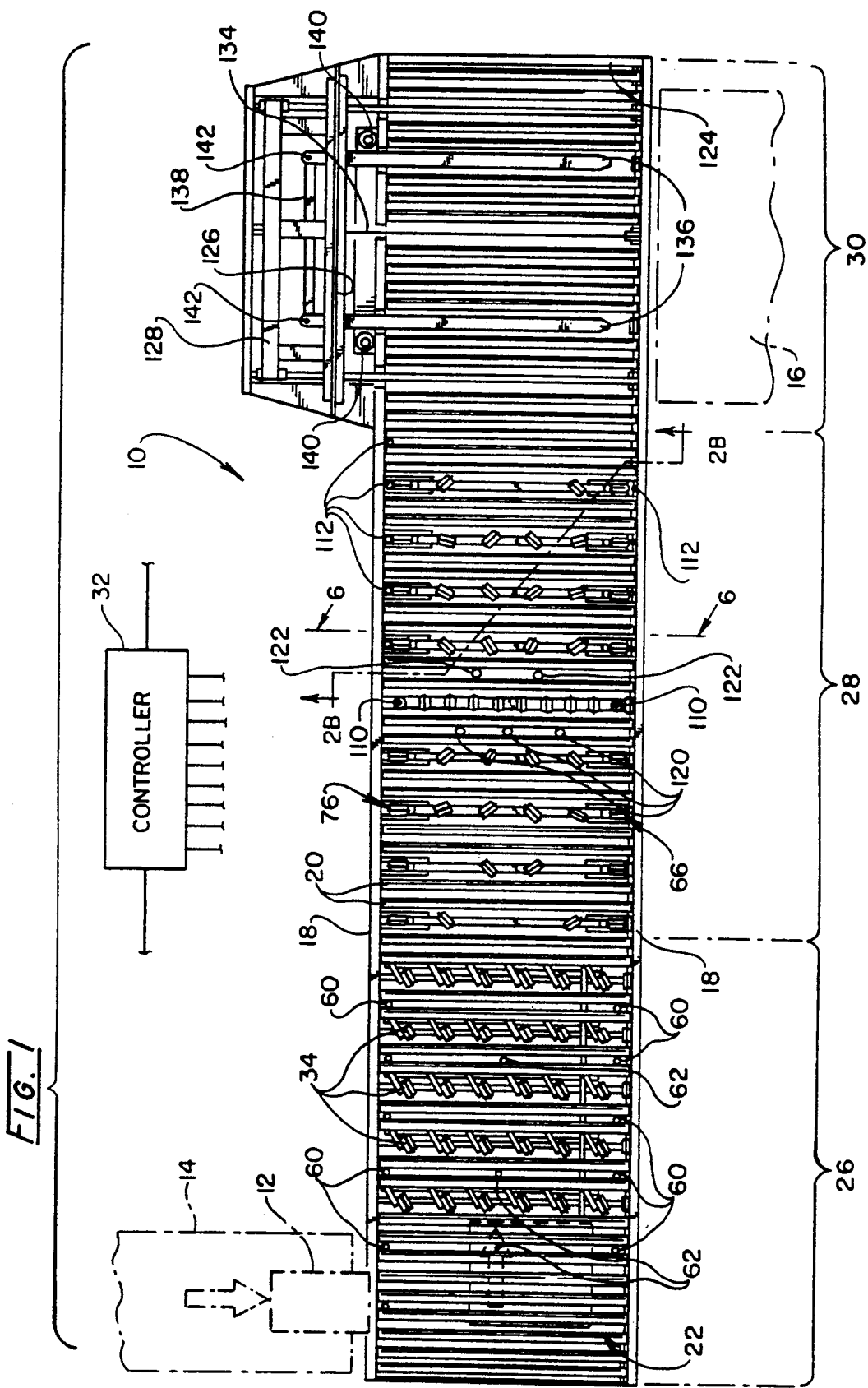

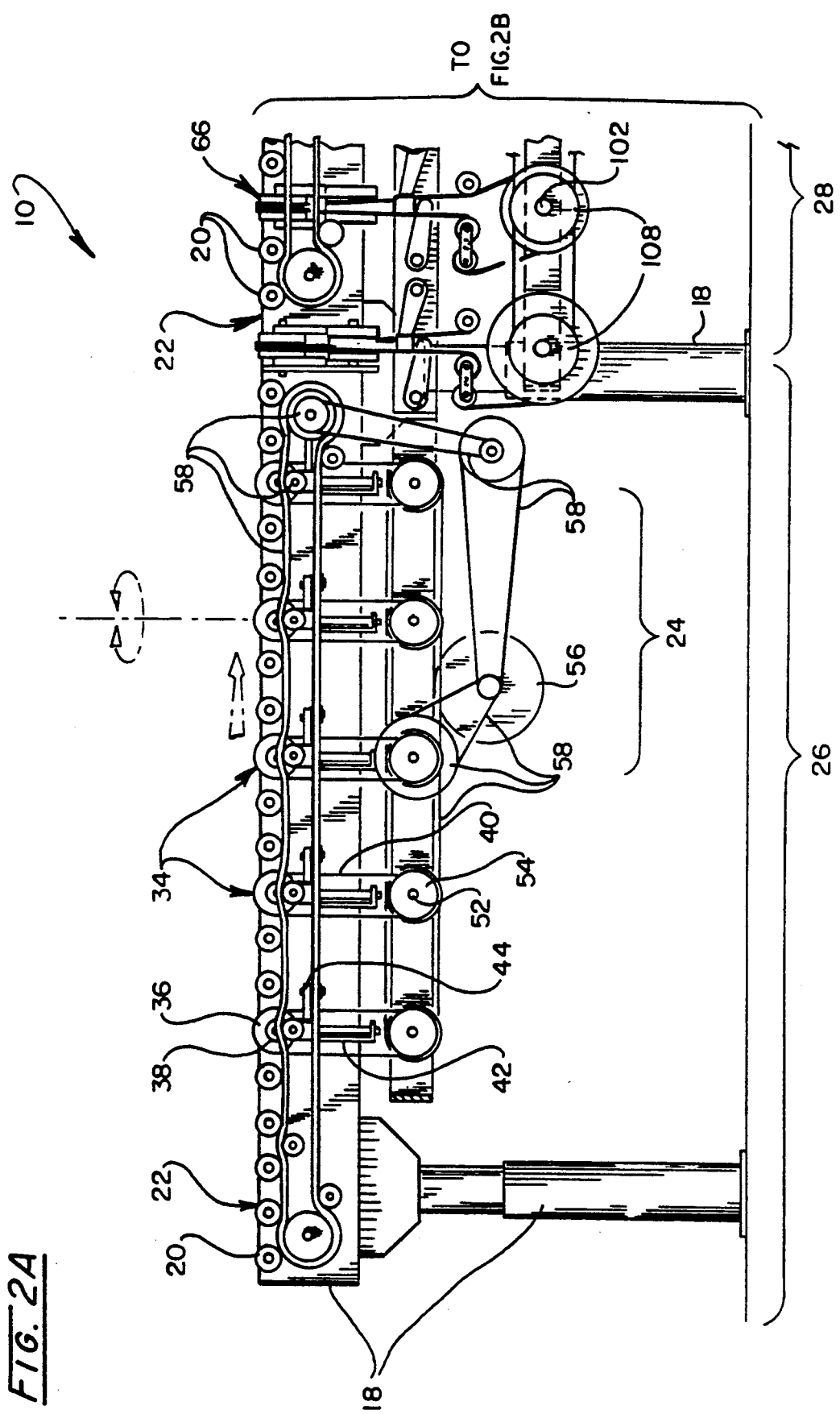

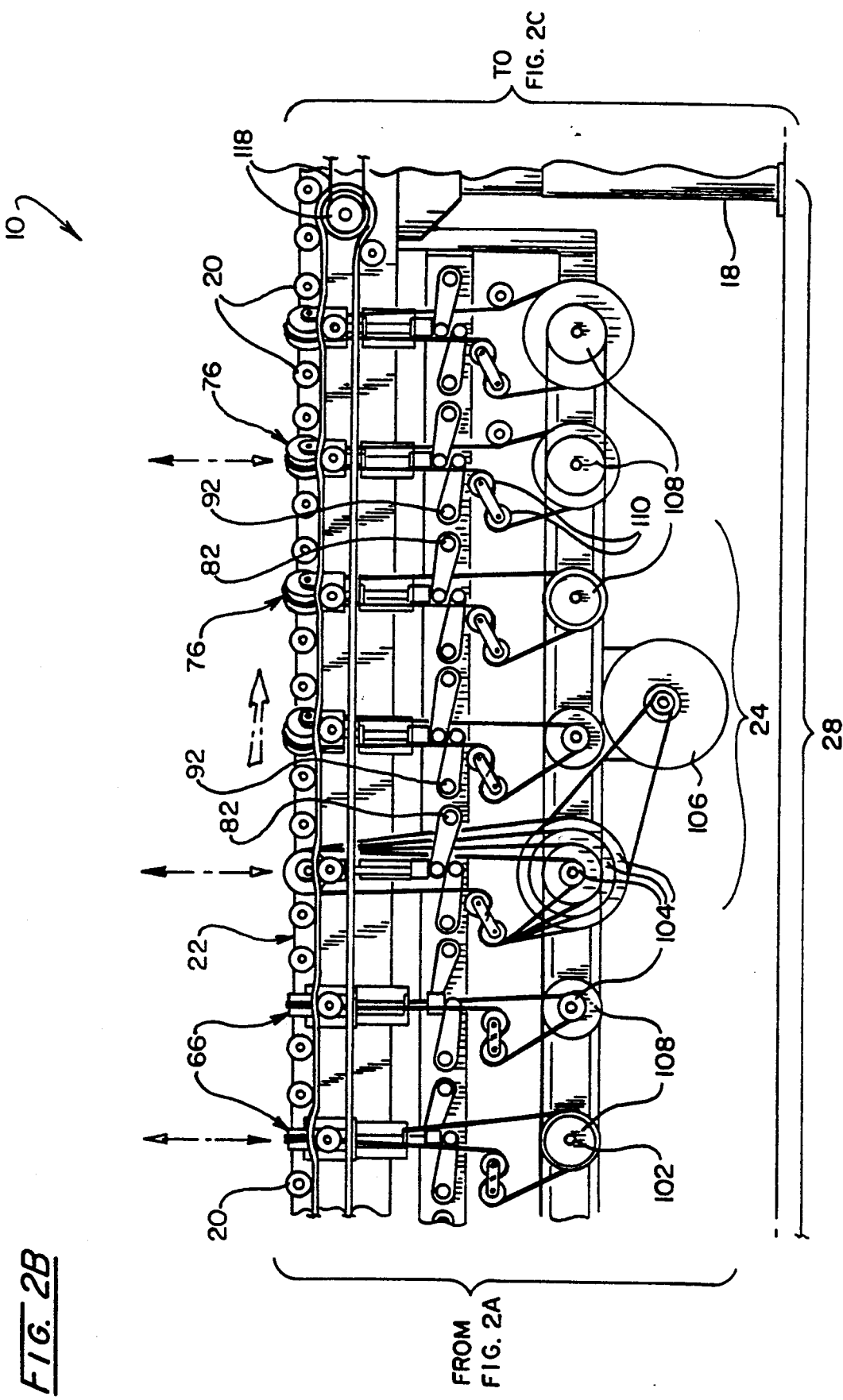

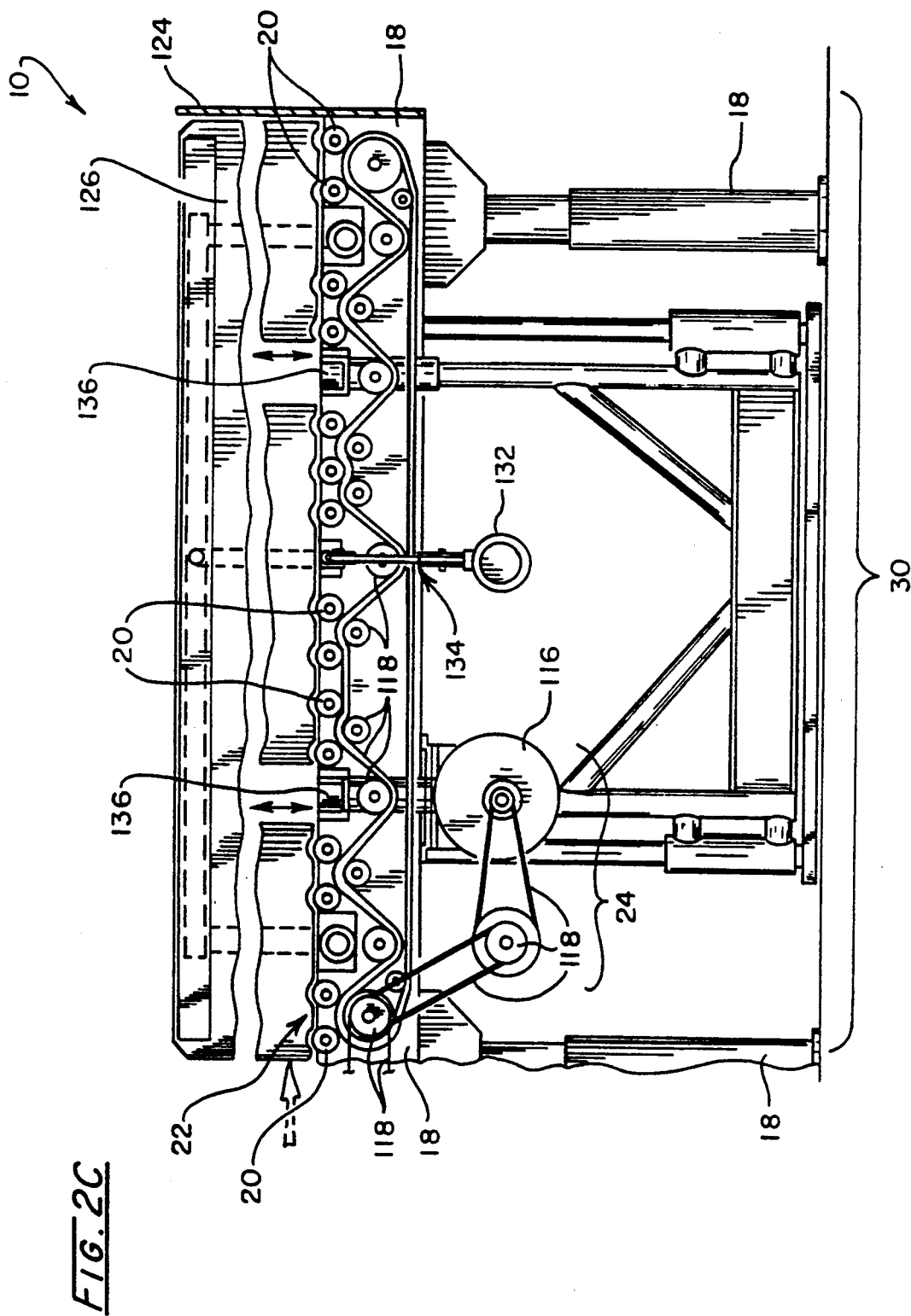

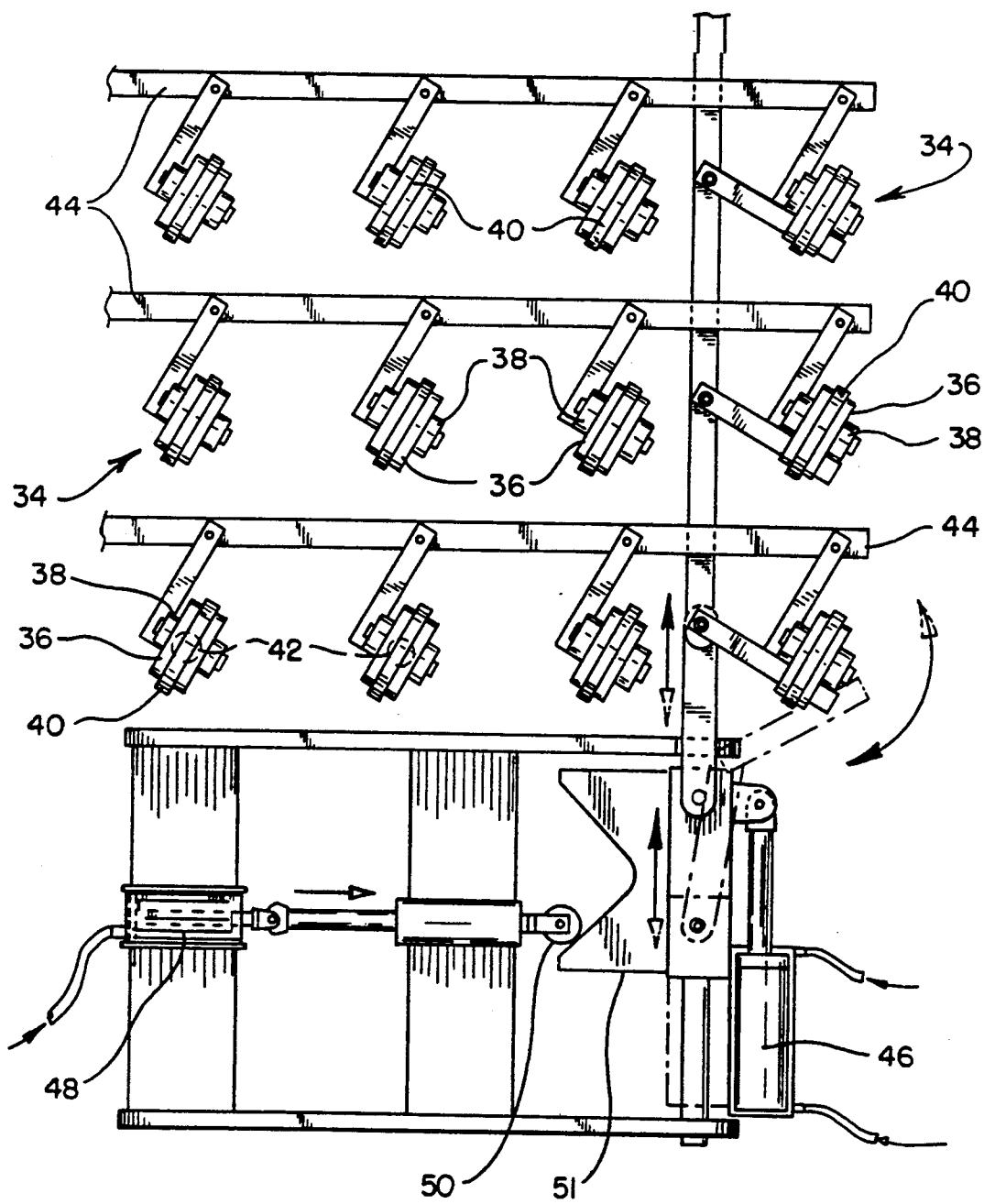

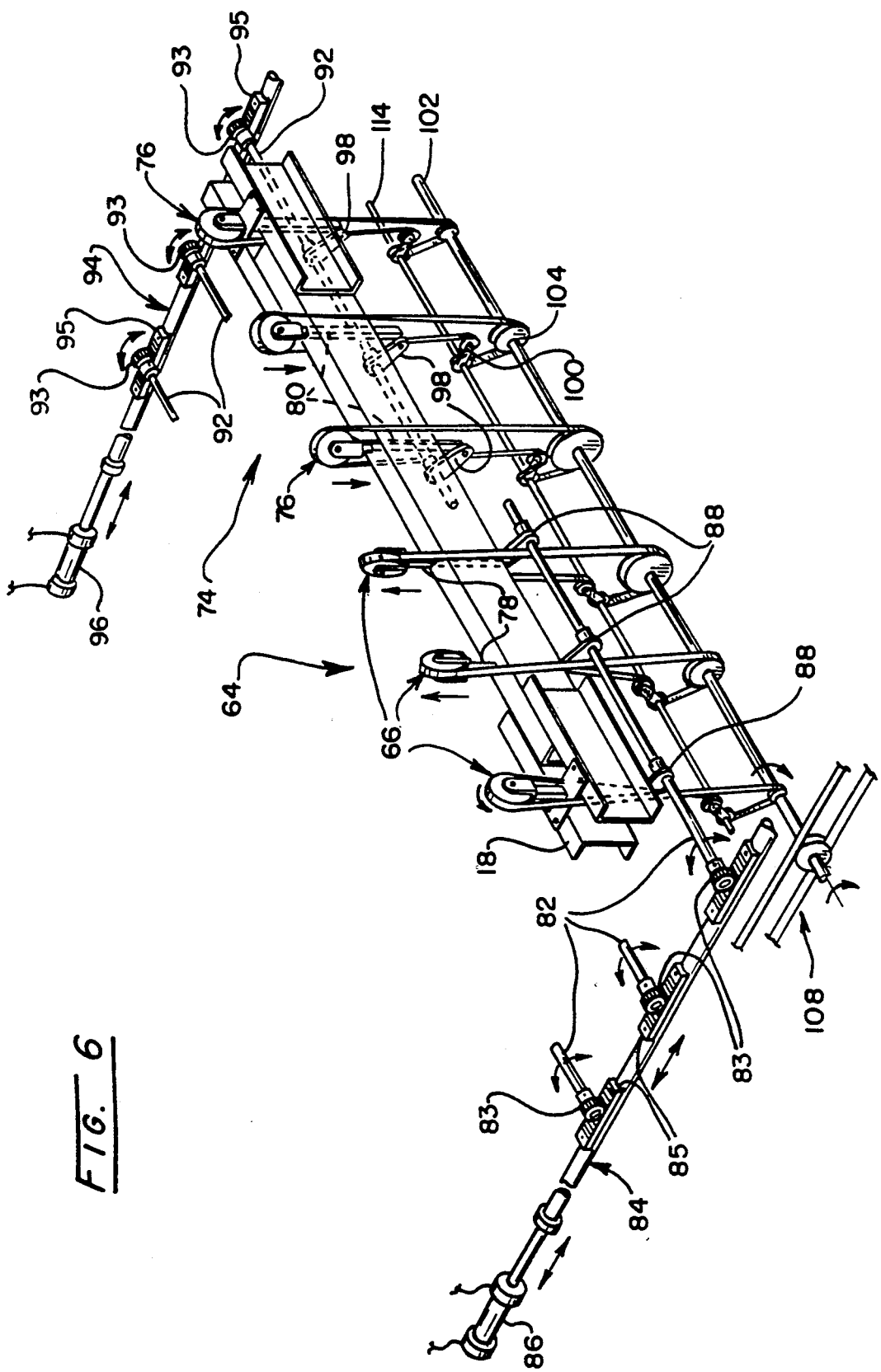

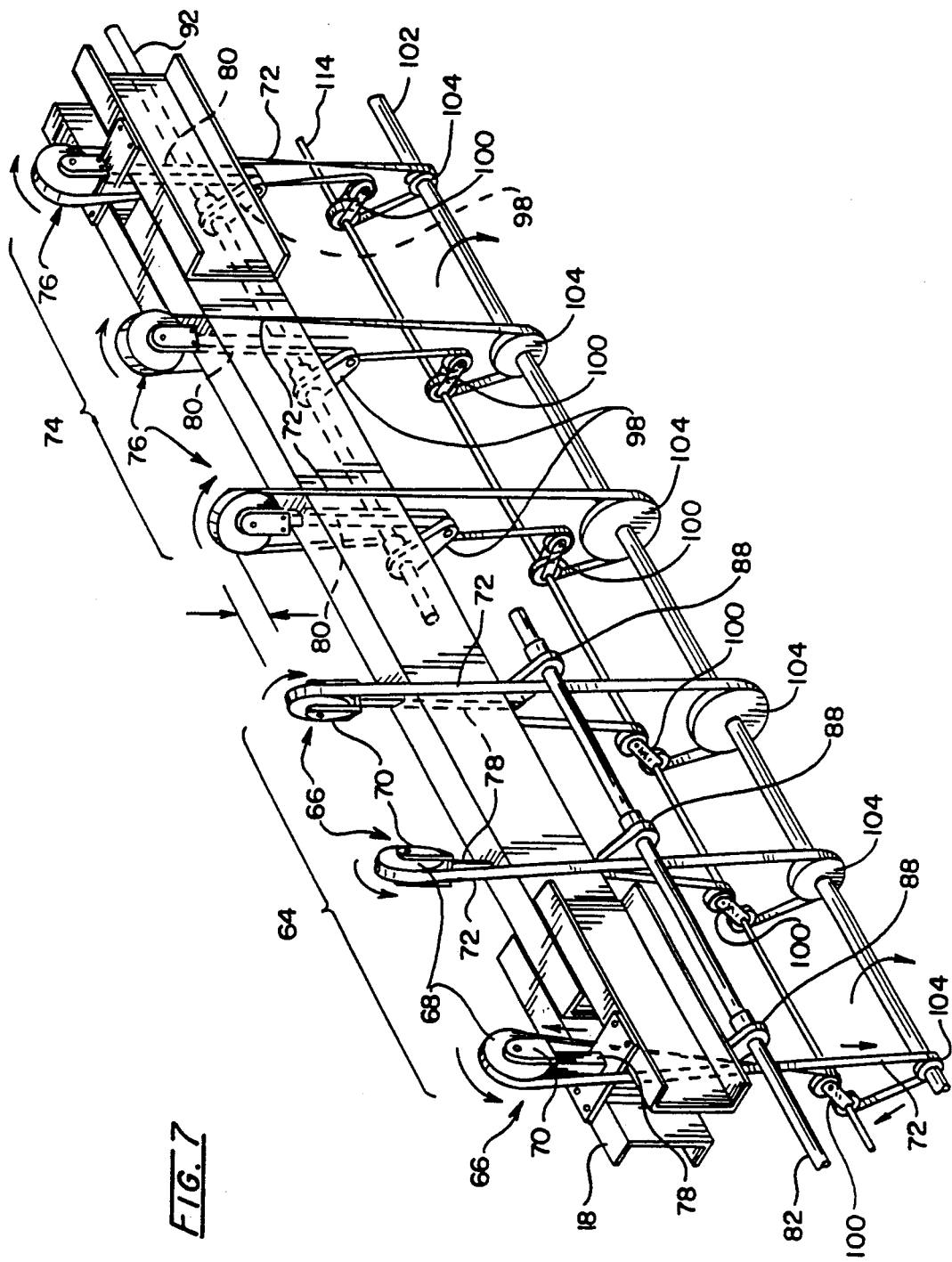

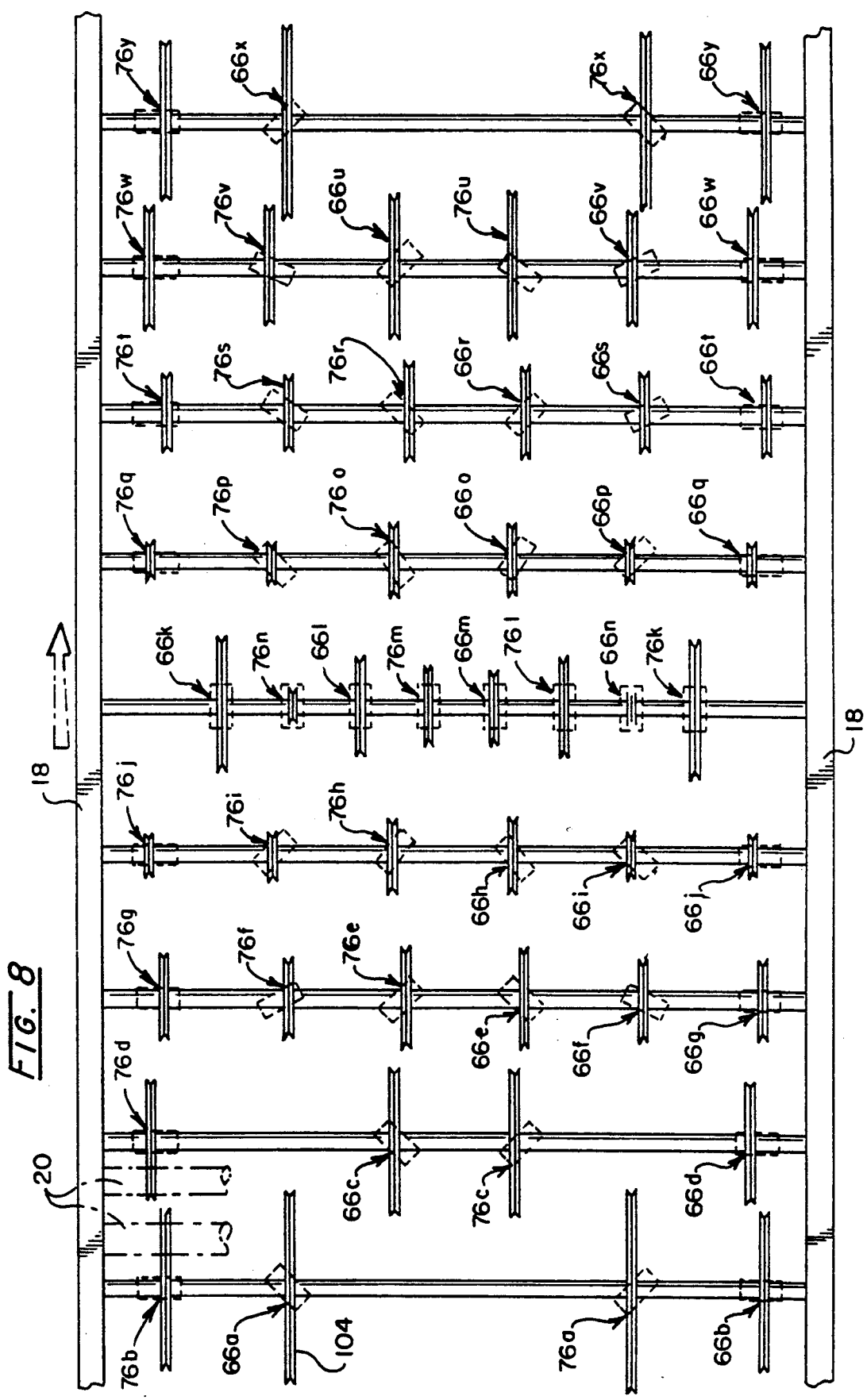

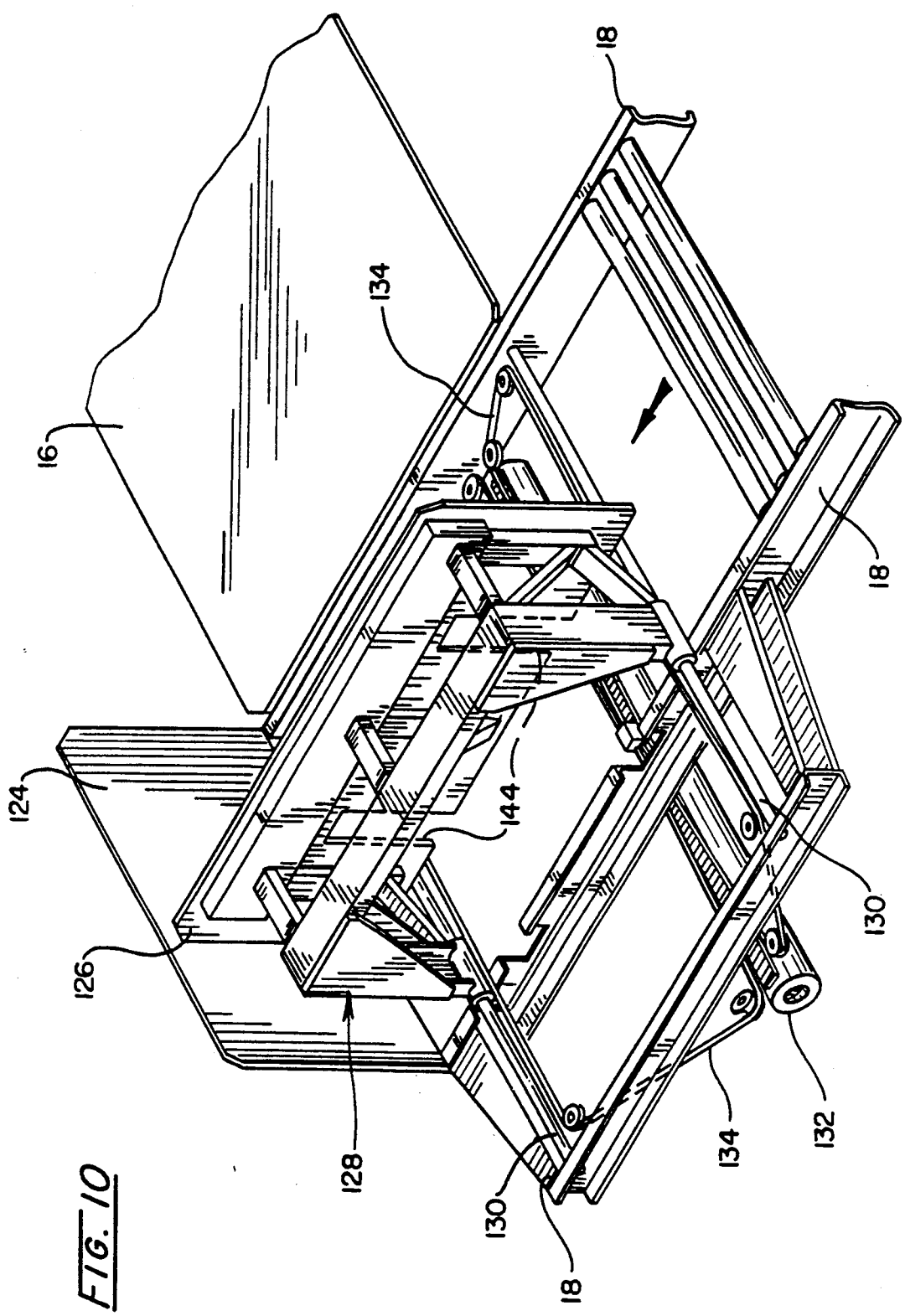

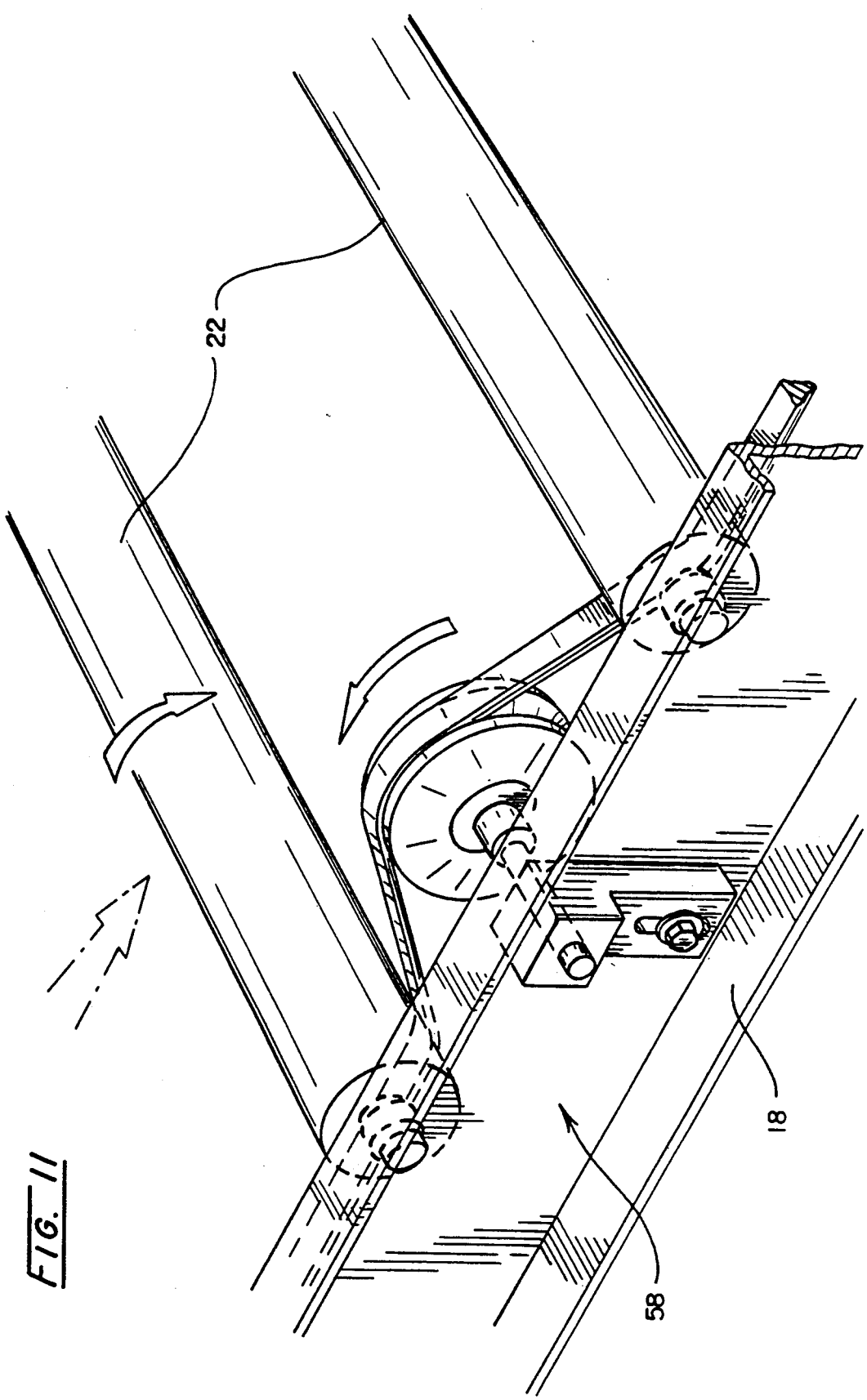

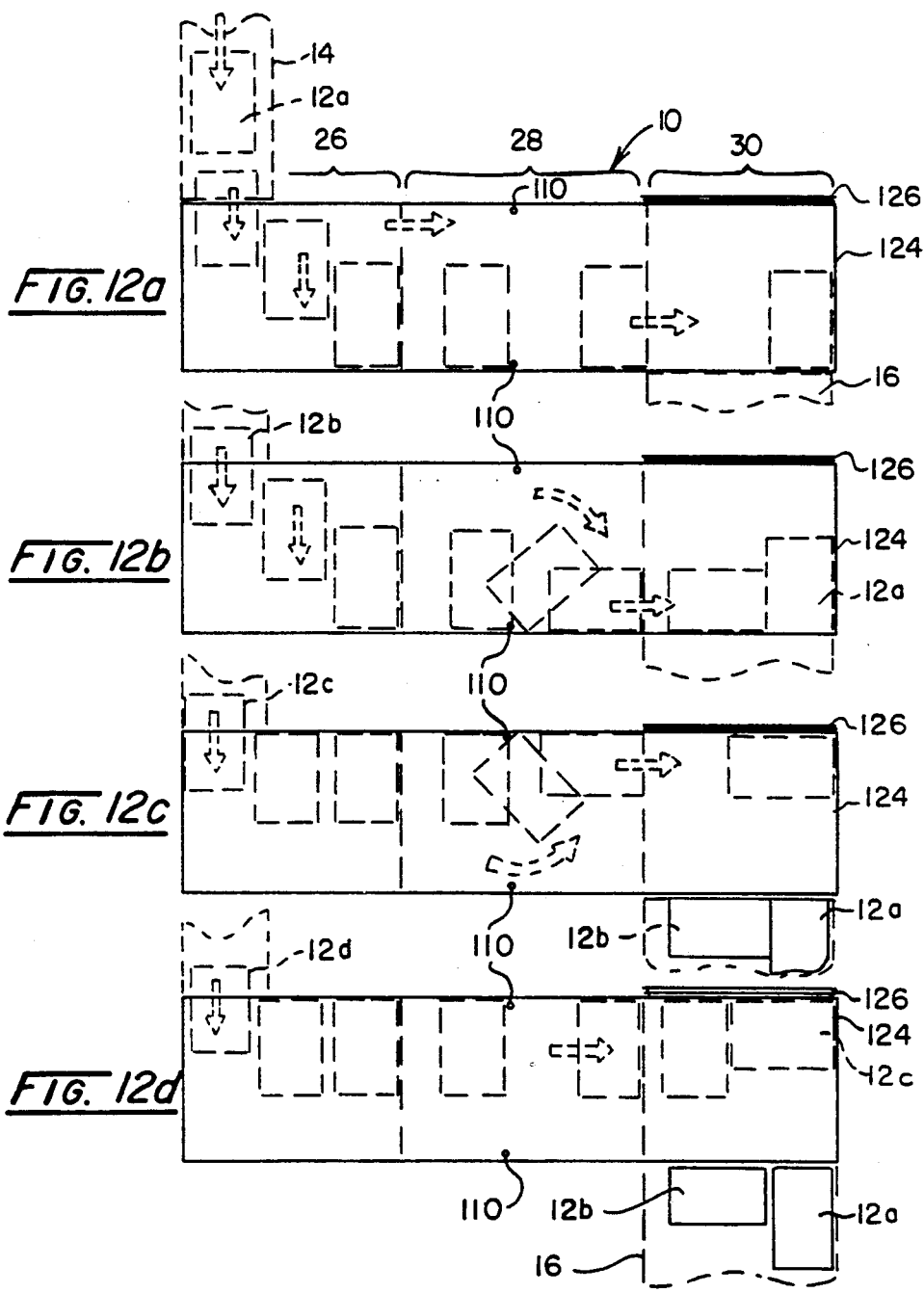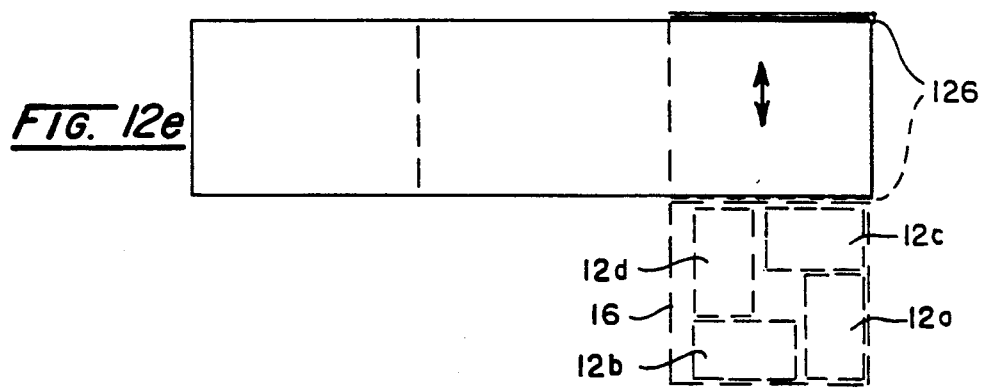

PATTERN FORMING CONVEYOR

BACKGROUND OF THE INVENTION

The present invention relates to the conveyance and organization of articles for shipping, in particular to a conveyor for conveying, adjusting, rotating and organizing bundles of corrugated boxes for shipment.

The trend in manufacturing has long been in the direction of increased automation to improve efficiency and reduce costs. While manufacturing processes have received significant attention in many industries, automation of procedures for transporting and organizing finished products from manufacturing to shipping have often lagged behind. Frequently, the procedures involve material handling problems which are unique and product-specific, and the solutions presented are limited. For example, apparatuses have been developed to convey, manipulate and organize manufactured articles, such as milk cartons, bricks and filled sacks, into groups for shipping, as disclosed in U.S. Pat. No. 3,820,302 to Doran et al; U.S. Pat. No. 4,014,441 to Osborn et al; and U.S. Pat. No. 3,700,127 to Kurk et al. A common drawback of such methods is that the progress of the finished goods on a conveyor must be interrupted to manipulate or organize the products. Interference in the flow of finished products from a manufacturing line may, accordingly, result.

In the manufacture of corrugated boxes, knocked-down boxes issue from manufacturing lines in bundles. Bundles may include any number of boxes, typically 25, and may be stacked loose or retained by a band. Current box manufacturing machines produce any number of box sizes within the range of the machine, producing one box size at a time. While most phases of such plants have now been automated, the manipulation and organization of bundles conveyed from the manufacturing line to shipping remains largely non-automated and relatively labor intensive. That is, typically, newly manufactured box bundles are transferred to a conveyor from which they are stacked manually or mechanically on a pallet for shipping, with the bundles being organized by hand into a pattern which substantially covers the pallet. Bundles are desirably organized into a pattern for efficient shipping.

Problems are encountered with current manual methods of manipulating and organizing bundles for shipping. Interruption in the progress of bundles from the manufacturing line is inevitable when manipulating and stacking bundles by hand, and jamming of bundles results. Moreover, bundles of large sized boxes present additional handling problems due to their size and bulk. Some automation has been introduced whereby bundles are rotated 90 degrees by stopping the conveyor, picking up the bundle, turning it, and replacing it on the conveyor. Such methods have the drawback of interrupting the progress of products on the conveyor and can on occasion cause bundles to come apart. As a consequence, the rate of production by box manufacturing machines is effectively limited by the rate at which the bundles produced may be manipulated and organized in preparation for shipment.

Accordingly, new methods are needed to automate the conveyance, manipulation and organization of box bundles for shipment and avoid the interruption in production occasioned by current methods of manipulating and manually organizing box bundles for shipment.

SUMMARY OF THE INVENTION

These needs are satisfied by the present invention wherein a conveyor continuously advances bundles while manipulating them into a pattern for shipment. Comprised of three zones, the conveyor sequentially centers, rotates and organizes bundles for discharge without manual intervention. As well, the present invention can handle any bundle size within the parameters of the particular embodiment, and performs the desired manipulation regardless of initial bundle placement or orientation. This insensitivity to bundle size and orientation is desirable because bundles may arrive on the conveyor in any orientation, and the stack may not be vertical, but may be twisted out of line. As there is no interruption in the flow of bundles, jamming of the conveyor is substantially eliminated. Further, as all components are located below the conveying surface there are no tunnels overhead through which bundles must pass and in which bundles may become jammed. The present invention thereby increases the overall speed of handling bundles, and makes possible the automation of shipping procedures in manufacturing facilities. Thus, the present invention may find application in conveying various bundles of goods manufactured in diverse facilities.

The conveyor of the present invention has an elongated conveying surface for continuously advancing bundles from the outfeed of manufacturing machines to discharge on a stacking device or pallet. Comprised of a plurality of parallel rollers, the conveying surface is further defined into three zones which further include, respectively, means for centering, rotating and discharging bundles organized into patterns for shipment. The parallel rollers are driven by power means for operating the conveyor and are disposed in the conveyor substantially perpendicular to the direction of box bundle movement down the conveyor. Overall coordination of the conveyor is accomplished by a control means for controlling, such as a programmable controller.

Bundle patterns, as are known in the art, constitute arrangements of one or more substantially similar sized bundles into a layer. Typically, there are 12 widely used bundle patterns. Layers of box bundles are typically palletized to achieve a stack having dimensions which are advantageous for shipping in trucks, containers, railcars and the like. Palletizing takes into account the formation of pallet-sized loads, which may or may not be positioned on an underlying pallet. Thus the conveyor of the present invention both provides layers of bundle patterns, and organizes bundles to fit into those patterns. Bundle patterns typically repeat every other layer, with the same bundle pattern oriented at 90 degrees or 180 degrees in the intervening layers.

In the first zone, centering rollers are spaced in rows between the parallel rollers to form a portion of the conveying surface. The centering rollers, also driven by the power means, preferably have an angular velocity at the conveying surface equal to the parallel rollers. The centering rollers are ordinarily substantially aligned with the parallel rollers at the conveying surface. Bundles entering the first zone are detected by means for sensing bundle location, such as bundle location sensors, disposed on the sides of the conveying surface, or, alternatively, near the center thereof. In operation, the centering rollers may be swiveled out of alignment with the parallel rollers by means for adjusting alignment, so as to urge a bundle to either side of the conveying surface as necessary to place it in a pattern. As a bundle reaches a side of the conveying surface, it is detected by bundle location sensors, such as photodetectors, which signal the centering rollers to realign with the parallel rollers. Throughout the process the bundle remains in contact with both the parallel rollers and the centering rollers, and thus, continuously advances down the conveyor at a constant speed.

Entering the second zone, a bundle is sensed by means for sensing the advance and rotation of a bundle which includes one or more pivot point sensors, such as photodetectors, disposed along each side of the conveyor to signal the presence of a bundle and generate bundle rotation signals. In accordance with the sequential order of the bundle in a pattern being formed, a first or second bundle rotation assembly may be extended above the conveying surface to lift and rotate a box bundle clockwise or counterclockwise, respectively. Each bundle rotation assembly is comprised of a plurality of bundle rotation rollers positioned in rows between the parallel rollers; means for rotating the bundle rotation rollers; and means for raising and lowering the bundle rotation rollers. The bundle rotation rollers are fixed at angles which urge the box bundle to both rotate and continue the advance of its leading edge in the direction of bundle movement. End point sensors, such as photodetectors, disposed along both sides of the conveying surface downstream of the pivot point sensors, signal the rotation of a bundle edge thereto and trigger the bundle rotation assembly to lower below the conveying surface. In accordance with the order of the bundle in a pattern, some bundles may not be rotated. An alternative embodiment of the second zone further includes one or more retractable posts and additional bundle location sensors to rotate small bundles, or to square up skewed bundles.

In the third zone, bundles which have now been manipulated into a desired position laterally and rotationally relative to the conveyor, advance into position in a pattern or partial pattern, which is being formed against a stop plate at the end of the conveying surface. Either a complete or a partial bundle pattern can be formed in the third zone. Once a complete or partial pattern forms, as determined by the bundle size and pattern, a pusher plate wipes across the conveying surface by operation of a means for wiping and discharges the complete or partial pattern onto a stacking plate of a stacking or palletizing device. The third zone further includes a lift mechanism comprised of two or more lift fingers and means for raising and lowering same, which lift a complete or partial bundle pattern above the conveying surface, allowing a second pattern to form below on the conveying surface prior to discharging both onto a stack. Because the time needed to lift a bundle pattern is shorter than the time needed to discharge a bundle pattern from the stacking plate, the lift mechanism is particularly advantageous in gracefully handling the flow of large box bundles, in effect single bundle patterns, without interrupting the advance of bundles on the conveyor.

The power means of the present invention includes a source of mechanical power, i.e. first, second and third electric motors which drive first, second and third means for transmitting mechanical power, respectively. First, second and third means for transmitting mechanical power are comprised of belts, pulleys and wheels adapted to transmit mechanical power as is known in the art. The first motor and first means for transmitting mechanical power drive, among other components, the centering rollers and the parallel rollers in the first zone. The second motor and second means for transmitting mechanical power drive, among other components, the bundle rotation rollers in the second zone. The third motor and third means for transmitting mechanical power drive, among other components, the parallel rollers in the second and third zones. The power means further includes means known in the art for transmitting electricity to the various electrical components of the present invention.

In a further feature of the present invention, the means for centering, means for rotating and means for discharging may be separately incorporated in existing conveyor systems, in cooperation with means for controlling and power means for operating, to provide their respective functions.

BRIEF DESCRIPTION OF THE DRAWINGS

FIG. 1 is a schematic top view of the conveyor of the present invention.

FIG. 2A is a side elevational view of the first zone of the conveyor of FIG. 1 comprising the means for centering bundles.

FIG. 2B is a side elevational view of the second zone of the conveyor of FIG. 1 comprising the means for rotating bundles.

FIG. 2C is a side elevational view of the third zone of the conveyor of FIG. 1 comprising the means for discharging bundles.

FIG. 4 is a schematic top view of the means for adjusting the alignment of the centering rollers.

FIG. 6 is a schematic perspective view of the means for raising and lowering first and second bundle rotation rollers represented by the row of such rollers along line 6—6 or FIG. 1.

FIG. 7 is an enlarged perspective view of the row of first and second bundle rotation rollers and first and second means for rotating of FIG. 6

FIG. 8 is a schematic top view of the first and second bundle rotation rollers.

FIG. 10 is a schematic perspective view of the means for discharging bundles, showing the pusher plate and related components.

FIG. 11 is a schematic perspective view of representative parallel rollers and means for transmitting power thereto is a schematic diagram.

FIG. 12 is a schematic diagram showing the formation of a typical bundle pattern.

DETAILED DESCRIPTION OF THE PREFERRED EMBODIMENT

Figure 3:
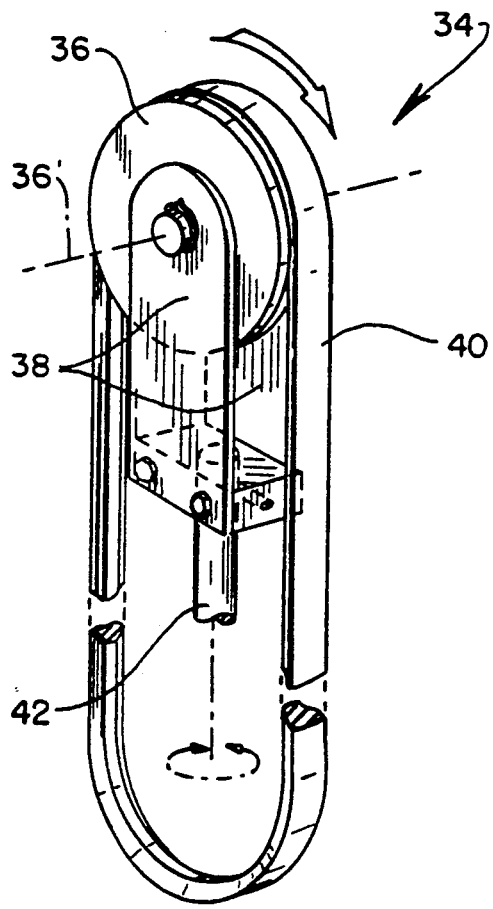
FIG. 3 is a perspective view of a centering roller.

Referring to FIG. 1, in accordance with the present invention, an apparatus 10 for conveying, adjusting, rotating, organizing and discharging bundles 12 of corrugated boxes for shipment is shown. Conveyor 10 advances bundles 12 from the outfeed of corrugated box manufacturing machine 14 to discharge in a pattern onto stacking device 16. Conveyor 10 is comprised of frame 18, in which a plurality of parallel rollers 20 form elongated conveying surface 22. Parallel rollers 20, driven by power means 24 (shown in FIGS. 2A-2C), continuously advance bundles by frictional contact in the direction of bundle movement indicated. It is understood that a typical bundle speed of substantially 1 foot per second is preferred. In conveyor 10 parallel rollers 20 are disposed in frame 18 generally perpendicular to the direction of bundle movement, and any orientation described with reference to parallel rollers 20 may equally be described relative to the direction of bundle movement. Alternatively, conveying surface 22 may be comprised of a plurality of powered belts as are known in the art, having gaps or spaces to accommodate additional elements of conveyor 10 disclosed below.

Conveying surface 22 is further defined into first, second and third zones 26, 28 and 30, respectively, which further comprise means for centering, means for rotating and means for discharging bundles for shipment. Overall coordination of conveyor 10 and organization of bundles 12 is accomplished by a control means 32, such as a commercially available programmable controller. As a result, one or more bundles 12 arriving at the infeed of conveyor 10 are arranged into a pattern, such as is known in the art, and bundles 12, thus arranged, form a layer in a stack on stacking device 16. A pallet (not shown) may be situated on stacking device 16 to receive layers of bundles 12, or bundles 12 arranged in palletized form on stacking device 16 without an underlying pallet.

In first zone 26, centering rollers 34 form a part of conveying surface 22, and are organized in rows spaced between parallel rollers 20. Centering rollers 34, shown in greater detail in FIG. 3, are each comprised of first rotatable pulley 36, pulley mount 38 and first drive belt 40. First drive belt 40 extends beyond the periphery of pulley 36 to make frictional contact with bundles 12. Alternatively, the periphery of pulley 36 could be adapted for frictional contact with bundles 12. Regardless, each pulley 36 rotates about an axis of rotation 36' in its respective pulley mount 38 by action of first drive belt 40.

Means for adjusting the axes of rotation of centering rollers 34 in and out of alignment with parallel rollers 20 enable centering rollers 34 to adjust the position of bundles 12 in first zone 26. Referring to FIG. 4, the means for adjusting the axes of rotation comprises a plurality of rotatable shafts 42, means for interconnecting rotatable shafts 42, i.e. linkage 44, and a centering mechanism 41. Each pulley mount 38 is mounted on a rotatable shaft 42, which is vertically disposed in frame 18 enabling centering rollers 34 to be swiveled. Preferably centering rollers 34 may be swiveled generally 30° out of alignment each way.

Linkage 44 interconnects rotatable shafts 42 which may be caused to swivel in unison by operation of linkage 44. Linkage 44 is operated by the action of centering mechanism 41 as follows. First cylinder 46, preferably a double-acting pneumatic cylinder, operates linkage 44 to rotate centering rollers 34 out of alignment with parallel rollers 20. Second cylinder 48, preferably a single-acting pneumatic cylinder, operates linkage 44 to realign centering rollers 34 with parallel rollers 20, in cooperation with roller wheel 50 and alignment plate 51 as indicated in FIG. 4. Means for operating first and second cylinders 46, 48 comprise, in the preferred embodiment, connection to sources of electric power and air pressure as are known in the art. When first cylinder 46 is pressurized to swivel centering rollers 34, second cylinder 48 is not pressurized. When second cylinder 48 is pressurized to realign centering rollers 34, first cylinder 46 is not pressurized. Alternatively, first and second cylinders 46, 48 could equally be electric or hydraulic cylinders, as are known in the art, connected to known means for operating.

Referring to FIG. 3, in operation, rotatable pulley 36 preferably rotates around an axis of rotation 36' and has a surface or angular velocity substantially equal to that of parallel rollers 20 at conveying surface 22. Means for rotating centering rollers 34 are shown in FIG. 2A. First drive belts 40 engage first drive wheels 54 which have substantially equal diameters and are attached to first axles 52. First axles 52 are rotatably disposed in frame 18 and driven by power means 24. Power means 24 comprises, in first zone 26, first motor 56 attached to a source of electric power (not shown), and first power transmission means 58 made of various belts, pulleys and wheels, as shown in FIG. 2A. First motor 56 and transmission means 58 drive parallel rollers 20 by frictional engagement therewith, as best shown in FIG. 11.

Also included in first zone 26 are a plurality of bundle location sensors 60, such as commercially available photodetectors or proximity switches, located outside or, preferably, inside the periphery of frame 18 as shown in FIG. 1. Disposed along both sides of conveyor 10, bundle location sensors 60 indicate the presence of a bundle 12 and in cooperation with control means 32, trigger centering rollers 34 to swivel and position bundle 12 as necessary for inclusion in a pattern.

As is known in the art, bundles may be transferred between adjoining conveyors in any orientation, partially off the edge thereof, and with the bundle stack twisted. Further, the outfeed of manufacturing machine 14 may be at an angle to the direction of bundle movement, as shown representatively in FIGS. 1 and 12, or as is more common, parallel to the direction of bundle movement. Advantageously, the present invention is insensitive to orientation or placement of box bundles. Within the parameters of a given embodiment, the present invention is also insensitive to box bundle size. As will be appreciated by one skilled in the art the present invention may be embodied in conveyors designed to handle substantially all sizes of bundles. In the first zone, centering rollers 34 will position bundles 12 arriving at the infeed of conveyor 10 so that at least one point of the bundle 12 ends up just inward from a side of the conveyor 10. If originally overhanging a side of conveyor 10, bundle 12 will be moved until it is entirely within the sides of conveyor 10, with again, one point positioned just inward from a side. Bundle sizes exceeding the width of conveyor 10 are recognized by the pattern which has been automatically or manually selected, and will be positioned on the edge desired while overhanging the other edge. It is preferred to include at least one bundle location sensor 62 generally inward from both sides of conveyor 10 to sense the presence of smaller bundles placed centrally on conveying surface 22.

Second zone 28 comprises first and second bundle rotation assemblies 64 and 74, respectively, shown in FIGS. 1 and 2B, and best shown in FIG. 6, which rotate bundles 12 clockwise or counterclockwise, respectively, relative to the direction of bundle movement. Bundle rotation assemblies 64, 74 include a plurality of first and second bundle rotation rollers 66, 76, respectively, as well as means to raise, lower and rotate bundle rotation rollers 66, 76. First and second bundle rotation rollers 66 and 76 are organized into rows located between parallel rollers 20,. Shown best in FIGS. 6 and 7, first and second means for raising and lowering may raise bundle rotation rollers 66 or 76, respectively, above conveying surface 22 to rotate a bundle 12, or may lower bundle rotation rollers 66 or 76 below conveying surface 22, allowing bundles 12 to advance unrotated. In FIGS. 6 and 7 first bundle rotation rollers 66 are shown in raised position while second bundle rotation rollers 76 are shown lowered. Conversely, in FIG. 2B, first bundle rotation rollers 66 are shown lowered below conveying surface 22, while second bundle rotation rollers 76 are raised.

Figure 5:
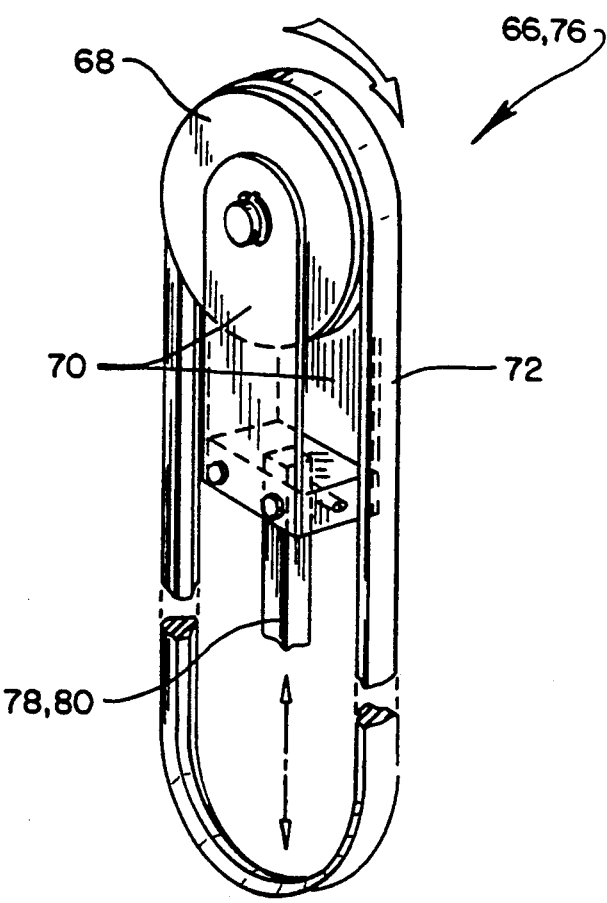
FIG. 5 is a perspective view of a bundle rotation roller.
Figure 9:
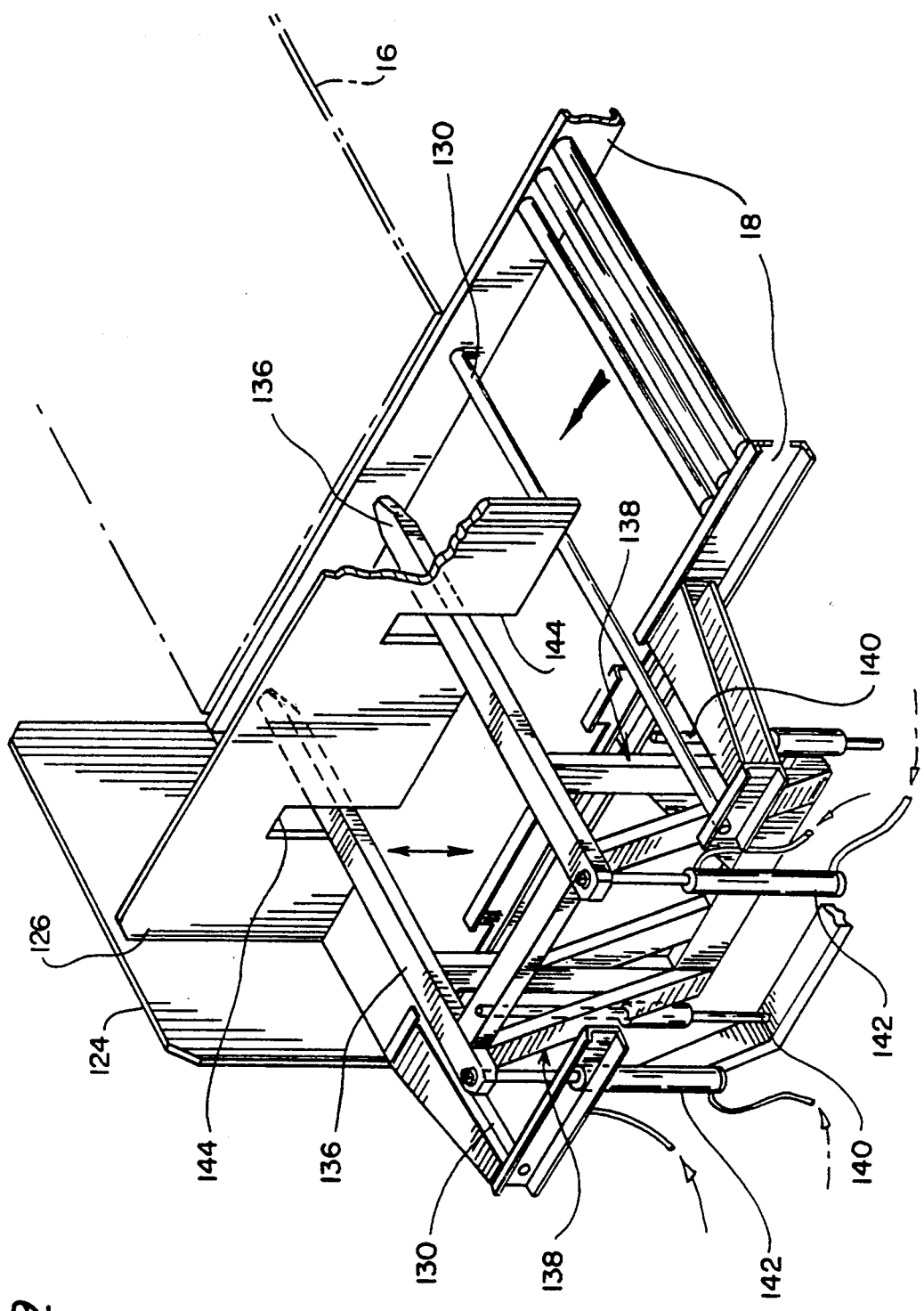
FIG. 9 is a schematic perspective view of the means for discharging bundles, showing the lift fingers and related components.

Shown in greater detail in FIG. 5, first and second bundle rotation rollers 66, 76 are comprised of like parts, including second rotatable pulleys 68, second pulley mounts 70, and second drive belts 72. Second pulley mounts 70 are mounted on first and second square shafts 78, 80 which are disposed in frame 18 and may be slidably displaced in the vertical direction as indicated, raising or lowering second rotatable pulleys 68. Second drive belts 72 extend beyond the periphery of second rotatable pulleys 68 and make frictional contact with bundles 12 when assemblies 64, 74 are raised above conveying surface 22. Alternatively, the periphery of second rotatable pulleys 68 could be adapted for frictional contact with bundles 12.

Referring to FIGS. 6 and 7, a row of first and second bundle rotation rollers 66, 76 are shown. The means for raising and lowering first and second bundle rotation rollers 66, 76 are comprised of like parts. A plurality of third and fourth axles 82 and 92, having first and second gears 83 and 93 respectively on one end thereof, are disposed in frame 18. Third and fourth axles 82 and 92 are pivoted in an arc by first and second flat gear assemblies 84, 94, respectively, having flat gear toothed sections 85, 95, which engage first and second gears 83, 93. First and second flat gear assemblies 84, 94, are operated, respectively, by third and fourth cylinders 86, 96, preferably double-acting pneumatic cylinders attached to a source of electric power and air pressure as known in the art. Alternatively, electric or hydraulic cylinders as known in the art may be used. Lateral movement of first and second flat gear assemblies 84, 94 pivot third and fourth axles 82 and 92. The pivot action of third and fourth axles 82 and 92 raises and lowers a plurality of first and second lever arms 88, 98 which are attached thereto. First and second lever arms 88, 98 connect to and correspondingly raise and lower first and second square shafts 78, 80, respectively, thereby causing first and second bundle rotation rollers 66, 76 to raise or lower. Slack in second drive belts 72 permitting such motion is taken up by idler pulley pairs 100. To accomplish this, one pulley of each idler pulley pair 100 is rotatably attached to fixed shaft 114 disposed in frame 18, and spring-biased as known in the art to tension second drive belt 72.

In operation individual ones of first bundle rotation rollers 66 are mounted at different fixed angles and rotate at different speeds which urge a bundle 12 to both rotate and continue to advance the leading edge thereof down conveyor 10. Second bundle rotation rollers 76 are similarly mounted and rotated to achieve opposite rotation while advancing the leading edge of bundle 12 down conveyor 10. This result is accomplished with first and second means for rotating bundle rotation rollers 76. As best shown in FIGS. 7 and 2B, second drive belts 72 may be engaged in one of a plurality of second drive wheels 104 which have different diameters, and thereby impart different rotational speeds to individual ones of first and second bundle rotation rollers 66, 76. Second drive wheels are attached to one of a plurality of second axles 102. Second axles 102 are rotatably disposed in frame 18 and driven by second motor 106, attached to a source of electricity (not shown) and second power transmission means 108 made of various belts, pulleys and wheels, as shown in FIG. 2B.

With reference to FIG. 8, Table 1 below sets forth example values for an arrangement of first and second bundle rotation rollers 66, 76 and related second drive wheel 104 values which achieve the results described above. The values set forth are exemplary and relate to the preferred embodiment.

TABLE 1

| | Bundle Rotation Roller | | Second Drive Wheel Diameter (inches) |
|---|---|---|---|
| No. | Speed (% of Parallel Roller Speed) | Angle (Clockwise Relative to Direction of Bundle Movement) | |
| 66a, 76a | 200 | 309, 51 | 12 |
| 66b, 76b | 160 | 270, 90 | 10 |
| 66c, 76c | 150 | 309, 51 | 9 |
| 66d, 76d | 120 | 270, 90 | 7.5 |
| 66e, 76e | 100 | 309, 51 | 6 |
| 66f, 76f | 87 | 291, 69 | 5 |
| 66g, 76g | 80 | 270, 90 | 5 |
| 66h, 76h | 75 | 328, 32 | 4.5 |
| 66i, 76i | 50 | 309, 51 | 3 |
| 66j, 76j | 40 | 270, 90 | 2.5 |
| 66k, 76k | 142 | 0, 0 | 8.5 |
| 66l, 76l | 107 | 0, 0 | 6 |
| 66m, 76m | 75 | 0, 0 | 4.5 |
| 66n, 76n | 36 | 0, 0 | 12 |
| 66o, 76o | 75 | 32, 328 | 4.5 |
| 66p, 76p | 50 | 39, 321 | 3 |
| 66q, 76q | 40 | 90, 270 | 2.5 |
| 66r, 76r | 100 | 39, 321 | 6 |
| 66s, 76s | 87 | 69, 291 | 5 |
| 66t, 76t | 80 | 90, 270 | 5 |
| 66u, 76u | 150 | 39, 321 | 9 |
| 66v, 76v | 125 | 79, 281 | 7.5 |
| 66w, 76w | 120 | 90, 270 | 7.5 |
| 66x, 76x | 200 | 39, 321 | 12 |
| 66y, 76y | 160 | 90, 270 | 10 |

Parallel rollers 20 in second zone 28 are driven by frictional engagement with third power transmission means 118 comprised of belts, pulleys and wheels, and powered by third motor 116, which is disposed in third zone 30 and shown in FIGS. 2B and 2C.

Also included in second zone 28 are means for sensing the advance and rotation of a bundle 12. Advance of bundle 12 is detected by at least one of two or more pivot point sensors 110, such as commercially available photodetectors or proximity switches. At least one pivot point sensor 110 is located along each side of conveyor 10 inward of the line of bundle location sensors 60 as shown in FIG. 1. Rotation of a bundle 12 is detected by at least one end point sensor 112.

As a bundle 12 enters second zone 28, all bundle rotation rollers 66, 76 are initially below conveying surface 22. Because at least one point of bundle 12 is positioned near an edge of conveyor 10, a pivot point sensor 110 will detect its advance. Depending on the pattern and order of bundle 12 in the sequential flow of bundles, pivot point sensors 110 in cooperation with controller 32 may trigger bundle rotation assembly 64 or 74 to raise, lifting, rotating and advancing bundle 12 to position a bundle edge along a side of conveyor 10. One or more end point sensors 112, such as commercially available photodetectors or proximity switches, are located along each side of conveyor 10 near the outfeed of second zone 28 to signal the rotation of a bundle edge thereto. In some cases, depending on the pattern, no bundle rotation will be required.

In an alternative embodiment, second zone 28 further comprises one or more posts 122 which can extend and retract below conveying surface 22. Post 122 is provided to rotate smaller bundles 12 which may be positioned more centrally on conveying surface 22, as required for insertion of bundle 12 in a pattern. One or more posts 122 may also be used to correct skewed orientation of bundles proceeding down conveying surface 22. Post 122 is operated by means known in the art, in cooperation with controller 32 and in response to signals from additional pivot point sensors 120 located towards the center of conveying surface 22.

Referring to FIGS. 1 and 2C, in third zone 30 parallel rollers 20 are driven by third motor 116 and third power transmission means 118 comprised of pulleys, belts and wheels. Bundles 12 arriving in third zone 30 have been positioned for insertion into a pattern. Bundles 12 will advance on conveying surface 22 until encountering stop plate 124 or other bundles in the pattern being formed. As shown in FIGS. 1, 2C, 9 and 10, third zone 30 further includes a pusher plate 126 and two or more lift fingers 136 for discharging complete or partial bundle patterns formed against stop plate 124. Either a complete or partial bundle pattern may be formed in third zone 30. Bundles 12 are discharged either in a pattern or as a partial pattern onto pre-existing stacking device 16 shown in FIG. 1 by operation of pusher plate 126 as described below.

Pusher plate 126 is supported by first sub-frame 128 which is slidably mounted on first rails 130 attached to frame 18, as best shown in FIG. 10. Means for wiping pusher plate 126 are further shown in FIG. 10. A band cylinder 132 operates cable and pulley assembly 134 to wipe pusher plate 126 across conveying surface 22 transverse to the direction of bundle movement, discharging a bundle pattern or partial bundle pattern to stacking device 16. Completion of a bundle pattern or partial bundle pattern which triggers discharge is established by controller 32 which counts the number of bundles 12 arriving sequentially for insertion into the bundle pattern. Where a partial bundle pattern is discharged onto stacking device 16, the pattern is completed on stacking device 16.

Two or more lift fingers 136 are supported by second sub-frame 138 which is slidably mounted on second rails 140. Means for raising and lowering lift fingers 136 comprise fifth and sixth cylinders, preferably single-acting pneumatic cylinders 142 attached to a source of electric power and air pressure as known in the art which operate to raise and lower lift fingers 136 along second rails 140. Electric, hydraulic or other cylinders known in the art could also be used. Slots 144 are provided in pusher plate 126 permitting lift fingers 136 to raise and lower, and pusher plate 126 to wipe across conveying surface 22 even when lift fingers 136 are raised. While two lift fingers are shown, numerous smaller fingers may be provided to accommodate patterns of smaller bundles 12.

In operation, lift fingers 136 lift a bundle pattern or partial bundle pattern above conveying surface 22, allowing a second pattern or partial pattern to form on the conveying surface below prior to discharge onto stacking device 16. Because the time needed to lift a bundle pattern is shorter than the time needed to discharge a bundle pattern from stacking device 16, lift fingers 136 are particularly advantageous in handling the flow of large bundles 12, in effect single bundle patterns, without interrupting the flow of bundles on conveyor 10.

Controller 32 of the present invention is preferably a commercially available programmable controller. Controller 32 can be programmed by one skilled in the art to receive and send signals as aforesaid, and to form desired bundle patterns in accordance with the operation of the present invention. Preferably, the controller will receive a signal from the manufacturing machine to indicate the size of bundles which are being produced and automatically select the bundle pattern for conveyor 10. Typically, at least 12 bundle patterns have been found to be used consistently in the corrugated box manufacturing industry, as shown in FIGS. 13 (a)–(l). Most patterns endeavor to achieve a generally square 48 inch by slightly less than 48 inch perimeter, as is preferred for use of standard pallets and efficient loading into trailers for shipment. However, other patterns are within the capability of the machine and may be used for other applications of the present invention both within and outside the corrugated box manufacturing industry discussed herein. As existing manufacturing machines may not have the capability to input the bundle size to controller 32, it is envisioned that in many applications the bundle pattern will be operator-selected in accordance with the bundle size produced by manufacturing machine 14.

While the operation of conveyor 10 is preferably accomplished automatically by controller 32 in response to the various sensors 60, 62, 110, 112 and 120, the present invention can be adapted for manual operation by manual controls as are known in the art. In connection therewith, controller 32 may further be adapted to permit manual programming of patterns into memory by establishing the sequence of bundle manipulations with those manual controls.

Figure 13D:
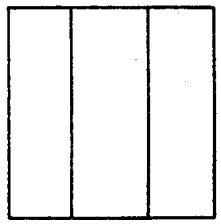
FIG. 13 is a diagram of bundle patterns.
Figure 13H:
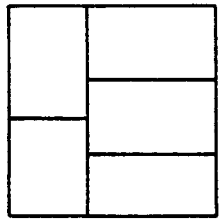
Figure 13L:
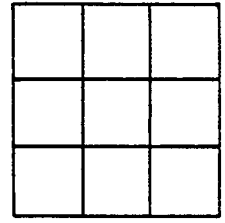
Figure 13C:
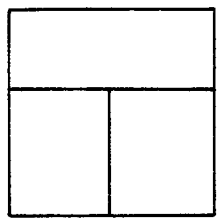
Figure 13G:
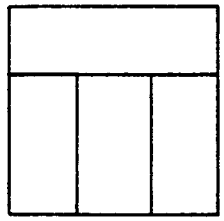
Figure 13K:
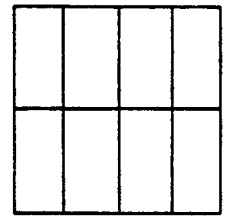
Figure 13B:
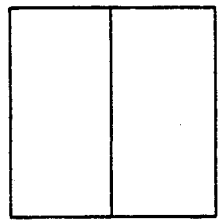
Figure 13F:
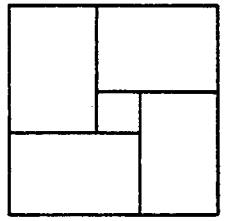
Figure 13J:
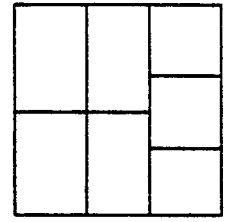
Figure 13A:
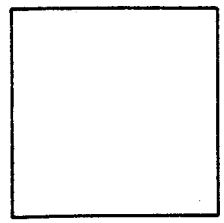
Figure 13E:
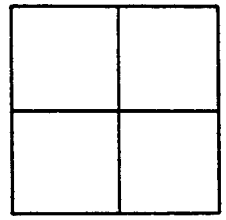
Figure 13I:
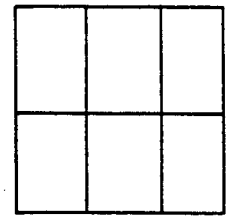

The formation of a typical bundle pattern shown in FIG. 13(f) is illustrated in FIG. 12. As may be seen in parts (a)–(d) thereof, a sequence of bundles 12a–12d arriving at the infeed of conveyor 10 may be organized for insertion into a typical pattern or partial pattern which forms against stop plate 124. Bundles may typically arrive at a rate of 18 bundles/minute from manufacturing machines. As shown in FIG. 12, bundle 12a arrives in first zone 26 where means for centering adjust its position to one side of the conveyor. While machine 14 is shown delivering bundles 12 from one direction, it is understood that machine 14 could deliver bundles 12 from substantially any direction onto conveyor 10. As well, the pattern shown should be initiated by aligning bundle 12a along the other side of conveyor 12. Further, a pattern which is a mirror image of that shown could be formed. Entering second zone 28, bundle 12a is, in this illustrative example, not rotated and proceeds to rest against stop plate 124 in third zone 30. Second bundle 12b enters first zone 26, and is adjusted to the same side as bundle 12a. Bundle 12b is, however, rotated in second zone 28, and comes to rest against bundle 12a. Thereafter, pusher plate 126 wipes across conveyor surface 22 to discharge or partial bundle pattern onto stacking device 16.

Bundle 12c enters first zone 26 and is adjusted to the other side of conveyor 10. In second zone 28 bundle 12c is rotated, and advances to rest against stop plate 124 in third zone 30. Finally, bundle 12d enters first zone 26, is adjusted to the same side as bundle 12c, and completes the second half of the pattern in third zone 30. The partial pattern thus formed may be discharged onto stacking device 16 by operation at pusher plate 126 where the bundle pattern is completed. If bundles 12a or 12d arrive in first zone 26 with skewed orientation, minor rotation of the bundle will occur when bundles 12a or 12d reach stop plate 124. In an alternative embodiment, some adjustment in bundle position may occur in second zone 28 by operation of one or more posts 122 which may rise momentarily to retard the leading edge of a bundle. Skewed orientation of bundles 12b and 12c is corrected during rotation thereof.

It may be understood that the sequence for forming the pattern shown in FIG. 12 may be varied. For example bundle 12a may be positioned second, after bundle 12b, and followed by bundles 12d and 12c. Needed manipulation may vary to accommodate the direction in which machine 14 delivers bundles to conveyor 10.

It should be apparent that comparable adjustment and rotation of bundles 12 will produce the other patterns (a)–(e) and (g)–(l) shown in FIG. 13. In each of the patterns, bundles of the same size are used to form the patterns. The pattern chosen for a bundle size is related to the size of the bundle and the desired size of the pattern. Typically, a pattern will be repeated every other layer of a stack, with the bundle pattern oriented either at 90 degrees or at 180 degrees in mirror image in the intervening layers. Alternating the bundle pattern orientation in alternating layers interlocks and stabilizes the pallet thus formed. Further, the extra thickness of glue laps of the boxes is distributed evenly within the pallet, further adding stability.

In a further aspect of the present invention, first, second and third zones 26, 28 and 30 may be separately incorporated as segments of existing conveyor lines to provide centering, rotating or discharge of bundles or other goods. In so doing, minor modifications of the various components described may be required. For example, an additional motor and modified power transmission means may be added to second zone 28 to power parallel rollers 20. Programming of controller 32 would also require modification to adapt the function of one or more zones to the application.

The various elements shown are commercially available and are manufactured of materials known in the art such as carbon steel for the frames, and stainless steel for the parallel rollers. Various substitutes are possible, as are apparent to those skilled in the art. For example, the conveying surface could be comprised of belted sections having gaps therebetween for the centering rollers 34 and bundle rotation rollers 66, 76. Placement of the various sensors, such photodetectors and proximity switches, could vary from the positions shown and achieve the same function by being tilted or otherwise disposed, or modified to sense at a given focal length.

Thus, while certain representative embodiments and details have been shown for purposes of illustrating the invention, it will be apparent to those skilled in the art that various changes in the apparatus disclosed herein may be made without departing from the scope of the invention, which is defined in the appended claims.

What is claimed is:

1. A pattern forming conveyor for conveying bundles from a manufacturing line to a point of discharge, comprising:
    a frame;
    an elongated conveying surface disposed in said frame for continuously advancing bundles in a direction of bundle movement;
    said conveying surface comprising first, second and third zones further comprising, respectively, means for centering bundles, means for rotating bundles, and means for discharging bundles, wherein:
        said means for centering is automatically adjustable to urge a bundle to simultaneously shift laterally to one of a plurality of positions in either direction on said conveying surface and advance in said direction of bundle movement substantially without rotation of said bundle; and
        said means for rotating is adapted to urge a bundle to simultaneously rotate and advance a bundle in said direction of bundle movement toward said third zone;
    means for controlling said means for centering, rotating and discharging bundles, whereby said means for centering is automatically adjusted; and
    power means for operating said conveyor adapted to drive said elongated conveying surface and said means for centering, rotating, discharging and controlling;
    whereby bundles may be manipulated and organized into one of a plurality of predetermined bundle patterns in said third zone and discharged therefrom.

2. A conveyor as recited in claim 1 wherein said means for controlling comprises automatic means for controlling comprising a programmable controller, wherein said programmable controller is adapted to automatically control the means for centering to limit the lateral shift of said bundle in either direction to any one of said plurality of positions by said means for centering, to automatically control the means for rotating to limit the simultaneous rotation and advancement of a bundle in a first or second direction, and to automatically control the means for discharging to manipulate bundles into one of said plurality of bundle patterns in response to a bundle size signal.

3. A conveyor as recited in claim 1 wherein said power means for operating said conveyor comprises:
    means for supplying electric power to said means for centering bundles, means for rotating bundles, means for discharging bundles, and means for controlling;
    a source of mechanical power comprising first, second and third motors disposed in said first, second and third zones, respectively, and connected to said means for supplying electric power; and
    first, second and third means for transmitting mechanical power connected to said first, second and third motors, respectively.

4. A conveyor as recited in claim 3 wherein said first means for transmitting mechanical power is further connected to said means for centering bundles and said elongated conveying surface disposed in said first zone; said second means for transmitting mechanical power is further connected to said means for rotating bundles in said second zone; and said third means for transmitting mechanical power is further connected to said elongated conveying surface disposed in said second and said third zones.

5. A conveyor as recited in claim 3 wherein said first, second and third means for transmitting power comprise:
- a plurality of first, second and third transmission axles disposed in said frame;
- a plurality of corresponding first, second and third transmission wheels attached, respectively, thereto; and
- a plurality of first, second and third transmission belts, respectively, engaged in at least one of said first, second and third transmission wheels.

6. A conveyor as recited in claim 1 wherein said means or controlling includes means for adjusting said means for centering, rotating and discharging to manipulate and organize a series of groups of two or more bundles into ones of said plurality of bundle patterns, wherein each group comprises bundles of substantially the same size, wherein the size of said bundles varies from group to group.

7. A conveyor as recited in claim 1 wherein:
- said means for centering includes a plurality of rotatable centering rollers organized in at least one row and forming a portion of said elongated conveying surface, said plurality of centering rollers adjustably alignable to urge a bundle to simultaneously shift laterally in either direction to one of a plurality of side and center positions and advance in said direction of bundle movement; and
- said means for rotating includes first and second bundle rotation assemblies adapted to rotate bundles in opposite first and second directions, and means for raising and lowering each of said bundle rotation assemblies separately, to urge a bundle to simultaneously rotate and advance.

8. A pattern forming conveyor for conveying bundles from a manufacturing line to a point of discharge, comprising:
- a frame;
- an elongated conveying surface disposed in said frame for continuously advancing bundles in a direction of bundle movement; said conveying surface comprising first, second and third zones further comprising, respectively, means for centering bundles, means for rotating bundles, and means for discharging bundles, wherein said means for centering bundles comprises:
  - a plurality of centering rollers organized in one or more rows and forming a portion of said elongated conveying surface;
  - means for rotating each of said centering rollers about respective axes of rotation;
  - means for adjusting said axes of rotation of said centering rollers in and out of alignment substantially perpendicular to said direction of bundle movement;
  - means for sensing the location of a bundle disposed on said conveying surface in said first zone, said means for sensing adapted to generate bundle location signals; and
  - means for controlling said means for centering, rotating and discharging bundles, wherein said means for controlling is adapted to receive said bundle location signals and send control signals to said means for adjusting said centering rollers; whereby said centering rollers may be adjusted to position a bundle on said conveying surface;
- power means for operating said conveyor adapted to drive said elongated conveying surface and said means for centering, rotating, discharging and controlling;
- whereby bundles may be manipulated and organized into one of a plurality of predetermined bundle patterns in said third zone and discharged therefrom.

9. A conveyor as recited in claim 8 wherein said centering rollers each comprise:
- a first rotatable pulley having an axis of rotation parallel with the axis of rotation of other ones of said first rotatable pulleys;
- a first pulley mount; and
- a first drive belt engaged in said first rotatable pulley, said first drive belt adapted for frictional contact with a surface of said bundles.

10. A conveyor as recited in claim 8 wherein said elongated conveying surface is comprised of a plurality of parallel rollers disposed in said frame; and wherein one or more of said centering rollers are organized in rows, and said rows are spaced between and alternating with one or more of said parallel rollers.

11. A conveyor as recited in claim 8 wherein said means for rotating said centering rollers comprises:
- one or more first axles rotatably disposed in said frame and driven by said power means for operating said conveyor; and
- a plurality of first drive wheels mounted on said one or more first axles, each of said first drive wheels correspondingly engaging at least one of said centering rollers;
- whereby said means for rotating rotates said centering rollers.

12. A conveyor as recited in claim 8 wherein said means for rotating each of said centering rollers rotates said centering rollers at an angular velocity substantially equal to that of said elongated conveying surface as measured in the plane of said conveying surface.

13. A conveyor as recited in claim 8 wherein said means for adjusting said axes of rotation of said centering rollers comprises:
- a plurality of rotatable shafts vertically disposed in said frame and adapted for mounting ones of said centering rollers thereon;
- means for interconnecting each of said rotatable shafts adapted to rotate said rotatable shafts in concert; and
- a centering mechanism attached to said means for interconnecting for adjusting the position of said rotatable shafts, said centering mechanism comprising:
  - a first cylinder for adjusting said means for interconnecting whereby said axes of rotation of said centering rollers move out of alignment substantially perpendicular to said direction of bundle movement;
  - a second cylinder and alignment plate for readjusting said means for interconnecting to a center point where said axes of rotation are aligned generally perpendicular to said direction of bundle movement; and
  - means for operating said first and second cylinders.

14. A conveyor as recited in claim 8 wherein said means for sensing the location of a bundle comprises:
- a plurality of first photodetectors disposed along both sides of said conveying surface, each of said first photodetectors adapted to signal the presence of a bundle proximate thereto.

15. A conveyor as recited in claim 14 wherein said means for sensing the location of a bundle further comprises:
  at least one first photodetector generally disposed inward from both sides of said conveying surface, said at least one first photodetector adapted to signal the presence of a bundle proximate thereto.

16. A pattern forming conveyor for conveying bundles from a manufacturing line to a point of discharge, comprising:
  a frame;
  an elongated conveying surface disposed in said frame for continuously advancing bundles in a direction of bundle movement;
  said conveying surface comprising first, second and third zones further comprising, respectively, means for centering bundles, means for rotating bundles, and means for discharging bundles wherein said means for rotating is adapted to urge a bundle to simultaneously rotate and advance a bundle in said direction of bundle movement toward said third zone, and said means for rotating bundles comprises:
    first and second bundle rotation assemblies adapted to rotate bundles in opposite first and second directions, respectively, relative to said direction of bundle movement, said first and second bundle rotation assemblies comprising, respectively, a first and a second;
    a plurality of bundle rotation rollers disposed in said frame in one or more rows at angles adapted to urge a bundle to simultaneously rotate and advance in a direction of bundle movement toward said third zone;
    means for rotating said plurality of bundle rotation rollers at speeds which both urge a bundle to rotate and continue its advance in said direction of bundle movement, said means for rotating adapted to impart different speeds to two or more of said plurality of bundle rotation rollers; and
    means for raising and lowering said plurality of bundle rotation rollers above and below said conveying surface; and
  means for sensing the advance and rotation of a bundle in said second zone adapted to generate bundle rotation signals;
  means for controlling said means for centering rotating and discharging bundles, wherein said means for controlling is adapted to receive said bundle rotation signals and send control signals to said means for raising and lowering said first or said second plurality of bundle rotation rollers; and
  power means for operating said conveyor adapted to drive said elongated conveying surface and said means for centering, rotating, discharging and controlling;
  whereby either said first or said second plurality of bundle rotation rollers may be engaged to lift, rotate and advance a bundle above said conveying surface, and thereafter lower said bundle to said conveying surface; and
  whereby bundles may be manipulated and organized into one of a plurality of predetermined bundle patterns in said third zone and discharged therefrom.

17. A conveyor as recited in claim 16 wherein said plurality of first and second bundle rotation rollers each comprise:
  a second rotatable pulley;
  a second pulley mount; and
  a second drive belt engaged in said second rotatable pulley, said second drive belt adapted for frictional contact with said bundles.

18. A conveyor as recited in claim 17 wherein said elongated conveying surface is comprised of a plurality of parallel rollers rotatably disposed in said frame; and wherein one or more of said first and second bundle rotation rollers are organized into rows and said rows are spaced between and alternating with one or more of said parallel rollers.

19. A conveyor as recited in claim 16 wherein, within each of said first and second bundle rotation assemblies, said respective first and second means for rotating said bundle rotation rollers each comprise:
  one or more second axles rotatably disposed in said frame, each driven by said power means for operating; and
  a plurality of second drive wheels mounted on said one or more second axles, each of said second drive wheels correspondingly engaging at least one of said bundle rotation rollers, at least two of said second drive wheels having different diameters adapted to impart different rotational speeds to corresponding ones of said bundle rotation rollers whereby a bundle may be turned while being continuously advanced.

20. A conveyor as recited in claim 16 wherein said means for sensing the advance and rotation of a bundle in said second zone comprises:
  one or more pivot point sensors disposed along both sides of said conveying surface at the infeed point of said second zone, said pivot point sensors comprising second photodetectors adapted to sense the presence of a bundle proximate thereto and generate a bundle rotation signal;
  one or more end point sensors, said end point sensors comprising third photodetectors disposed along both sides of said conveying surface downstream of said second photodetectors, adapted to signal the rotation of a bundle edge thereto.

21. A conveyor as recited in claim 16 wherein two or more of said bundle rotation rollers, disposed in said frame in one or more rows, are disposed at different angles.

22. A pattern forming conveyor for conveying bundles from a manufacturing line to a point of discharge, comprising:
  a frame;
  an elongated conveying surface disposed in said frame for continuously advancing bundles in a direction of bundle movement; said conveying surface comprising first, second and third zones further comprising, respectively, means for centering bundles, means for rotating bundles, and means for discharging bundles, wherein said means for discharging bundles comprises:
    a stop plate adapted to stop the advance of said bundles in said direction of bundle movement;
    a first sub-frame attached to said frame;
    a pusher plate supported by said first sub-frame;
    means for wiping said pusher plate across said conveying surface transverse to the direction of bundle movement attached to said first sub-frame;

a second sub-frame attached to said frame;

two or more lift fingers supported by said second sub-frame and adapted to lift at least one of said bundle patterns above said conveying surface;

means for raising and lowering said two or more lift fingers, respectively, above and below said conveying surface;

whereby one or two of said bundle patterns may be discharged simultaneously; and means for controlling said means for centering, rotating and discharging bundles; and power means for operating said conveyor adapted to drive said elongated conveying surface and said means for centering rotating, discharging and controlling;

whereby bundles may be manipulated and organized into one of a plurality of predetermined bundle patterns in said third zone and discharged therefrom.

23. A pattern forming conveyor for conveying bundles from a manufacturing line to a point of discharge, comprising:

a frame;

an elongated conveying surface disposed in said frame for continuously advancing bundles in a direction of bundle movement; said conveying surface comprising first, second and third zones further comprising, respectively, means for centering bundles, means for rotating bundles, and means for discharging bundles; wherein said means for rotating bundles comprises:

first and second bundle rotation assemblies adapted to rotate bundles clockwise or counterclockwise, respectively, relative to said direction of bundle movement, wherein:

said first bundle rotation assembly comprises:

a first plurality of bundle rotation rollers disposed in said frame in one or more rows at angles adapted to urge a bundle to both rotate and advance in a direction of bundle movement;

first means for rotating said first plurality of bundle rotation rollers at speeds which both urge a bundle to rotate and continue its advance in said direction of bundle movement; and first means for raising and lowering said first plurality of bundle rotation rollers above and below said conveying surface, wherein said first means for raising and lowering said first plurality of bundle rotation rollers comprises:

a first plurality of shafts slidably and vertically disposed in said frame, said first plurality of shafts adapted for mounting ones of said first plurality of bundle rotation rollers thereon;

means for sliding said first plurality of shafts comprising:

one or more third axles disposed in said frame, adapted to rotate in an arc;

a plurality of first lever arms attached to said one or more third axles adapted to displace respective ones of said first plurality of shafts upon rotation of said third axles in an arc; and means for rotating said one or more third axles in concert comprising a third cylinder, a first flat gear assembly and a first gear disposed on the end of each of said one or more third axles, said first gear engaged in said first flat gear assembly; and a first plurality of idler pulley pairs, ones of said idler pulley pairs engaged in each of said first bundle rotation rollers and adapted to facilitate raising and lowering said first bundle rotation rollers; and said second bundle rotation assembly comprises:

a second plurality of bundle rotation rollers disposed in said frame in one or more rows at angles adapted to urge a bundle to both rotate and advance in a direction of bundle movement;

second means for rotating said second plurality of bundle rotation rollers at speeds which both urge a bundle to rotate and continue its advance in said direction of bundle movement; and second means for raising and lowering said second plurality of bundle rotation rollers above and below said conveying surface, wherein said second means for raising and lowering said second plurality of bundle rotation rollers comprises:

a second plurality of shafts slidably disposed in said frame, said second plurality of shafts adapted for mounting ones of said second plurality of bundle rotation rollers thereon;

means for sliding said second plurality of shafts comprising:

one or more fourth axles disposed in said frame, adapted to rotate in an arc;

a plurality of second lever arms attached to said one or more fourth axles adapted to displace respective ones of said second plurality of shafts upon rotation of said fourth axles in an arc; and means for rotating said one or more fourth axles in concert comprising a fourth cylinder, a second flat gear assembly and a second gear disposed on the end of each of said one or more fourth axles, said second gear engaged in said second flat gear assembly; and a second plurality of idler pulley pairs, ones of said idler pulley pairs engaged in each of said second bundle rotation rollers and adapted to facilitate raising and lowering said second bundle rotation rollers, means for sensing the advance and rotation of a bundle in said second zone adapted to generate bundle rotation signals; and means for controlling said means for centering, rotating and discharging bundles, wherein said means for controlling is adapted to receive said bundle rotation signals and send control signals to said means for raising and lowering said first or said second plurality of bundle rotation rollers, whereby either said first or said second plurality of bundle rotation rollers may be engaged to lift, rotate and advance a bundle above said conveying surface, and thereafter lower said bundle to said conveying surface;

power means for operating said conveyor adapted to drive said elongated conveying surface and said means for centering, rotating, discharging and controlling;

whereby bundles may be manipulated and organized into one of a plurality of predetermined bundle patterns in said third zone and discharged therefrom.

24. A pattern forming conveyor for conveying bundles from a manufacturing line to a point of discharge, comprising:

a frame;

a plurality of parallel rollers rotatably disposed in said frame substantially forming an elongated conveying surface for continuously advancing bundles in a direction of bundle movement;

said conveying surface comprising first, second and third zones further comprising, respectively, means for centering bundles, means for rotating bundles, and means for discharging bundles;

means for controlling said conveyor adapted for organizing one or more bundles in a pattern for shipping; and power means for operating said conveyor adapted to drive said parallel rollers, said means for centering bundles, said means for rotating bundles, said means for discharging bundles and said means for controlling;

wherein said means for centering bundles comprises:
a plurality of centering rollers spaced between said parallel rollers and forming a portion of said conveying surface;
means for rotating each of said centering rollers about an axis of rotation;
means for adjusting said axes of rotation of said centering rollers in and out of alignment with said parallel rollers;
means for sensing the location of a bundle disposed on said conveying surface in said first zone, said means for sensing adapted to generate bundle location signals; and wherein said means for rotating bundles comprises:
first and second bundle rotation assemblies adapted to rotate bundles clockwise and counterclockwise, respectively, relative to said direction of bundle movement, said first and second bundle rotation assemblies each comprising, respectively, a first or second:
plurality of bundle rotation rollers disposed in said frame between said parallel rollers at angles adapted to urge a bundle to both rotate and advance in a direction of bundle movement;
means for rotating said plurality of bundle rotation rollers at speeds which both urge a bundle to rotate and continue its advance in said direction of bundle movement; and
means for raising and lowering said plurality of bundle rotation rollers above and below said conveying surface;
means for sensing the advance and rotation of a bundle in said second zone adapted to generate bundle rotation signals;

wherein said means for discharging bundles comprises
a stop plate adapted to stop the advance of said bundles in said direction of bundle movement;
a sub-frame;
a pusher plate supported by said sub-frame;
means for wiping said pusher plate across said conveying surface transverse to said direction of bundle movement attached to said sub-frame;
two or more lift fingers supported by said sub-frame and adapted to lift at least one of said bundle patterns above said conveying surface;
means for raising said two or more lift fingers above said conveying surface;

wherein said means for controlling is further adapted for receiving bundle location signals and sending responsive control signals to said means for adjusting said centering rollers; receiving bundle rotation signals and sending responsive control signals to said means for raising and lowering said bundle rotation rollers; and triggering said means for discharging when a bundle pattern is completed;

whereby a series of bundles conveyed from a manufacturing line are manipulated and organized into at least one of a plurality of predetermined bundle patterns in said third zone, and discharged therefrom.

25. A conveyor as recited in claim 24 wherein said means for controlling comprises automatic means for controlling including a programmable controller, wherein said programmable controller is adapted to automatically control the means for centering, means for rotating and means for discharging to manipulate bundles into one of said plurality of bundle patterns in response to a bundle size signal.

26. A method for conveying, manipulating and organizing a group of two or more bundles into one of a plurality of bundle patterns on a conveyor, said bundles in said group arriving one at a time, and said conveyor advancing said bundles in a direction of bundle movement from a point of infeed to a point of discharge from said conveyor, comprising, for each bundle in said pattern, the steps of:

automatically adjusting a bundle laterally to one of a plurality of positions in either direction on the conveyor while said bundle simultaneously advances in a direction of bundle movement substantially without rotation;

automatically rotating said bundle as necessary in one of opposite first and second directions of bundle rotation for insertion in said one of said plurality of bundle patterns while said bundle simultaneously advances in said direction of bundle movement; and automatically accumulating said bundle against a stop plate, interrupting said direction of bundle movement until a complete bundle pattern is established against said stop plate;

said steps of automatically adjusting and automatically rotating being variably performed for each bundle in said group as required to completely establish said one of a plurality of bundle patterns; and automatically discharging said bundle pattern from said conveyor.

27. A method as recited in claim 26 wherein said step of automatically adjusting includes the steps of:

sensing the presence a bundle with at least one of a plurality of means for sensing the location of a bundle to generate bundle location signals;

positioning said bundle laterally, in response to said bundle location signals, to one of said plurality of positions on said conveyor with means for centering bundles; and sensing the position of said bundle after positioning at said one of said plurality of positions with at least one of said plurality of means for sensing the location of a bundle, to generate bundle location signals to end the positioning of said bundle.

28. A method as recited in claim 26 wherein said step of automatically rotating includes the steps of:
   sensing the advance of said bundle with at least one of a plurality of means for sensing the advance and rotation of a bundle to generate bundle rotation signals to begin rotation;
   rotating said bundle, as necessary in one of said first and second directions of bundle rotation, in response to said bundle rotation signals, to position said bundle in said bundle pattern; and
   sensing the position of said bundle after rotation with at least one of said plurality of means for sensing the advance and rotation of a bundle, to generate bundle rotation signals to end rotation of said bundle.

29. A method as recited in claim 26 wherein:
   said step of automatically accumulating includes the steps of:
      accumulating a first bundle pattern against said stop plate;
      lifting said first bundle pattern above said conveyor with two or more lift fingers; and
      accumulating a second bundle pattern against said stop plate; and
   said step of automatically discharging includes the step of simultaneously discharging said first and second bundle patterns from said lift fingers and said conveyor.

30. A method as recited in claim 27 wherein said step of positioning said bundle laterally includes performing simultaneously the steps of:
   adjustably aligning a plurality of rotatable centering rollers when said centering rollers are organized in at least one row and form a portion of said elongated conveying surface; and
   urging a bundle with said rotatable centering rollers to simultaneously shift laterally in position and advance in said direction of bundle movement.

31. A method as recited in claim 28 wherein said step of rotating said bundle, as necessary, includes:
   performing simultaneously the steps of:
      raising said bundle with one of first and second bundle rotation assemblies adapted to rotated a bundle in one of said first and second directions;
      rotating said bundle with said one bundle rotation assembly; and
      advancing said bundle in said direction of bundle movement; and, thereafter,
   lowering said one bundle rotation assembly.

32. A method as recited in claim 26 wherein:
   said step of automatically adjusting includes performing simultaneously the steps of:
      adjustably aligning a plurality of rotatable centering rollers organized in at least one row and forming a portion of said elongated conveying surface; and
      urging a bundle with said rotatable centering rollers to simultaneously shift laterally in position and advance in said direction of bundle movement; and
   said step of automatically rotating includes:
      performing simultaneously the steps of:
         raising a bundle with one of first and second bundle rotation assemblies adapted to rotate a bundle in one of said opposite first and second directions;
         rotating a bundle with said one bundle rotation assembly; and
         advancing said bundle in said direction of bundle movement; and, thereafter,
         lowering said one bundle rotation assembly.

* * * * *